United States Patent
Hasegawa et al.

[11] Patent Number: 6,128,153
[45] Date of Patent: *Oct. 3, 2000

[54] HEAD POSITION CONTROL FOR A DISK DRIVE WHICH PERFORMS RECORDING ABOUT THE ROTATIONAL CENTER EVEN IF THE RECORDED SERVO INFORMATION IS ECCENTRIC

[75] Inventors: Susumu Hasegawa; Yukihiro Uematsu; Tomoyoshi Yamada; Takahisa Ueno; Nobuyuki Suzuki; Keiji Aruga; Shuichi Hashimoto, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/805,161

[22] Filed: Feb. 24, 1997

[30] Foreign Application Priority Data

Jun. 10, 1996 [JP] Japan ................................. 8-147439

[51] Int. Cl.⁷ .................................................. G11B 5/596
[52] U.S. Cl. ..................................... 360/77.08; 360/77.04
[58] Field of Search ............................. 360/77.04, 77.08, 360/78.09, 78.12

[56] References Cited

U.S. PATENT DOCUMENTS

| | | |
|---|---|---|
| 4,616,276 | 10/1986 | Workman .............................. 360/77.04 |
| 4,764,914 | 8/1988 | Estes et al. ....................... 360/77.04 X |
| 5,050,016 | 9/1991 | Squires ................................. 360/77.08 |
| 5,444,371 | 8/1995 | Tomisaki et al. ................. 360/77.04 X |
| 5,539,714 | 7/1996 | Andrrews, Jr. et al. ......... 360/77.04 X |
| 5,541,784 | 7/1996 | Cribbs et al. .................... 360/77.04 X |
| 5,615,191 | 3/1997 | Takeda et al. ................... 360/77.04 X |

*Primary Examiner*—Paul Loomis
*Assistant Examiner*—K. Wong
*Attorney, Agent, or Firm*—Greer, Burns & Chain, Ltd.

[57] ABSTRACT

Head position control is implemented in a disk drive for the case in which a disk is assembled into the disk drive after a precise track is recorded onto it using an external apparatus, which is capable of high-speed access even if there is eccentricity between a track defined by servo information and the center of rotation of the track. Two phase servo bursts consisting of servo information are recorded onto each of the servo information regions of a disk surface, in mutual alternation, the strength ratio between signals detected from these two phase servo bursts being used to determine to which side the head is displaced. By performing control so that this strength ratio is a prescribed value at each angular position, control is achieved so that the head moves along a circular path of rotation, even if there is eccentricity in the servo circular path defined by the recorded servo information with respect to the center of rotation.

22 Claims, 19 Drawing Sheets

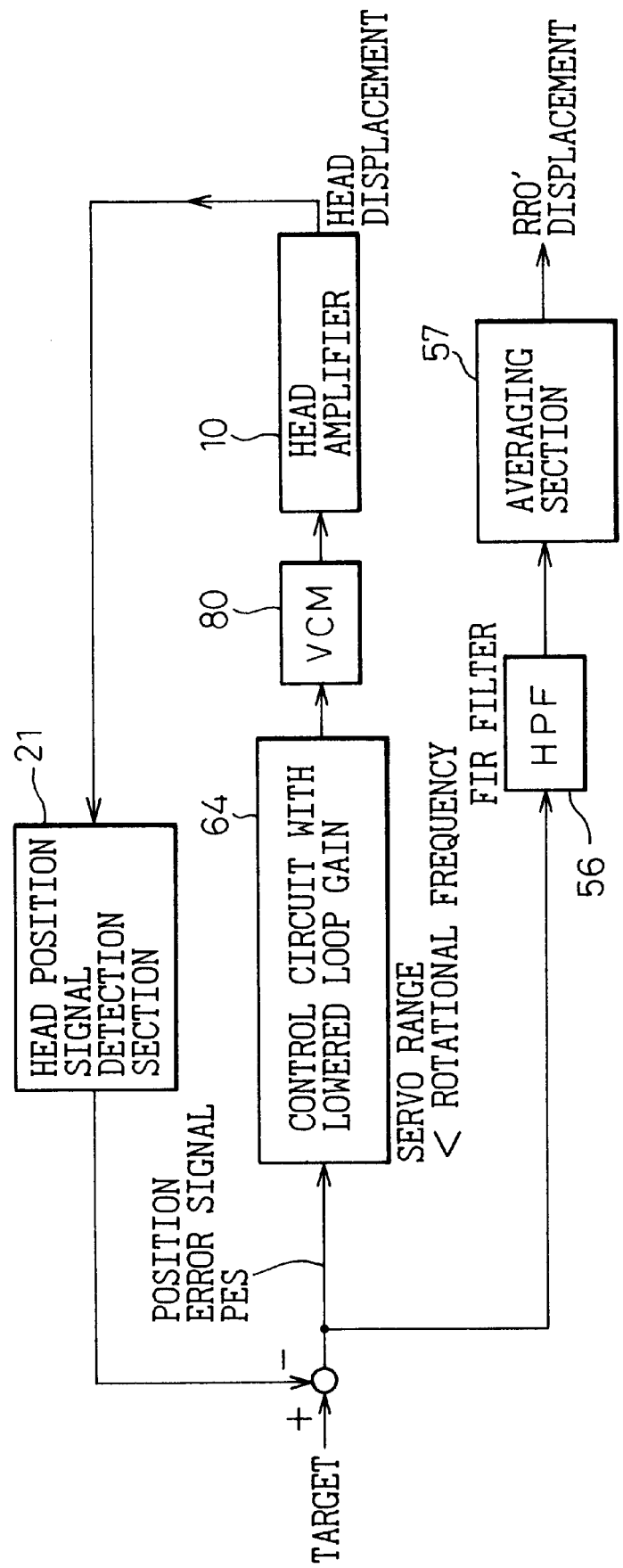

HEAD POSITION CONTROL FOR A DISK DRIVE WHICH PERFORMS RECORDING ABOUT THE ROTATIONAL CENTER EVEN IF THE RECORDED SERVO INFORMATION IS ECCENTRIC

BACKGROUND OF THE INVENTION

1. Field of the Invention

The present invention relates to a magnetic disk drive and to a head position control method for a magnetic disk drive, and more particularly to a magnetic disk drive and to a head position control method for a magnetic disk drive which are capable of performing high-speed seek and high-accuracy positioning, even if a servo track which is defined by servo information recorded on the surface of the disk is eccentric with respect to the center of rotation.

2. Description of Related Art

In recent years, to achieve an increase in the storage capacity of magnetic disk drives, efforts have been made to achieve even higher density, with an accompanying need to improve access speed. Various methods have been proposed to achieve an increase in magnetic disk drive storage capacity and an improvement in access speed.

In a magnetic disk apparatus (hereinafter referred to simply as a disk drive), a magnetic head (hereinafter referred to simply as a head) records data onto a magnetic disk (hereinafter referred to simply as a disk) by recording a magnetic pattern, and reads out data that has been recorded onto the disk by detecting magnetic field variations occurring due to this recorded magnetic pattern. To establish the position for recording and reading out, a magnetic guide on the disk known as a track is recorded onto the disk coaxially with respect to the center of rotation of the disk. By specifying a track, the position in the radial direction is identified. Each track on the disk is divided in the circumferential direction into a plurality of parts known as sectors, the sector numbers of which identify each of the sectors being recorded onto the disk. Recording of data is performed in units of sectors and, by specifying a sector number, it is possible to identify the circumferential position. In a disk drive which has a plurality of disks having the same rotational axis and a head provided for each recording surface of the disk, the heads are linked so as to move in concert, one of the disk surfaces, for example, being made a servo surface, onto which information related to tracks and sectors is recorded, with only data being recorded onto the other disk surfaces, in what is known as a dedicated servo system. However, in this dedicated servo system, the head position with respect to the servo surface has a head position error with respect to the written data position. Because of variations in temperature, vibration of the head movement mechanism, and the like, it is not possible to make this error very small. Therefore, it was difficult to increase the density by making the track spacing sufficiently narrow. For this reason, in recent years data has been written on all disk surfaces, with information related to the track recorded at the very beginning of the sectors of each disk surface, this being detected so as to control the head position. This system, in which servo information is recorded together with data is known as an embedded servo system.

In current disk drives, a disk is mounted on the rotating shaft of a spindle motor, servo information is recorded by means of a servo track writer (STW) so as to perform track writing initialization. The writing and readout of data are performed after performing this initialization operation. In reality, an STW program is started and servo information is written onto the disk surface by a head. Thus, the path of a track is a circle which has as its center the center of rotation. This applies to both the embedded servo system and the dedicated servo system.

However, in reality, because the head and disk are vibrating while the track is being written, the track is not a true circle, but rather vibrates about a circular path. In order to improve the recording density of a disk apparatus, it is necessary to increase the number of tracks that can be recorded on a disk. However, when the disk vibrates, because of the risk of mutual interference between adjacent tracks, it is not possible make the track spacing very narrow, thereby presenting an obstacle to the improvement of recording density.

SUMMARY OF THE INVENTION

In consideration of the above-noted drawbacks, the inventor of the present invention envisioned the possibility of improving the recording density by assembling a disk onto a rotational hub after accurately recording the tracks using an external apparatus. If only the track is to be recorded, it is possible to use a highly precise spindle motor and head actuator, it being possible to achieve more accurate track recording by using a dedicated head, enabling the achievement of high recording density by making the track spacing narrow. However, when mounting a disk onto which tracks have been recorded to a rotational hub of a spindle motor, even if the mounting accuracy is improved, it is not possible to avoid some degree of eccentricity, with the center of the track not being in agreement with the center of rotation. Although it is possible to envision that adjustment can possibly make the eccentricity yet smaller, the required adjustment is extremely delicate, it being extremely difficult to achieve a sufficiently accurate adjustment, so that even if this were possible, the labor required to make the adjustment would present the problem of increased cost.

In an embedded servo system having a plurality of disk surfaces, it can be envisioned that it is sufficient to perform tracking control of just the head which is performing data writing or readout, and in the case in which feedback control is used so that the head under control tracks to the center of the track, when the head under control is switched to a different head, the switched head waits until tracking on the target track is achieved, and after tracking is achieved to the target track, data writing and readout are performed. However, this is accompanied by the problem of a lengthened access time when the head is switched.

The present invention was made as a means of solving the above-described problems. An object of the present invention is to implement head position control in a disk drive which is capable of high-speed access, even if a track defined in terms of servo information is eccentric with respect to the center of rotation.

In the various servo information recording regions of a disk surface, servo information including two phase servo bursts which are radially offset and circumferentially staggered are recorded in mutual alternation. The servo information recorded has an indication signal that indicates that it is servo information and a signal which indicates the track number and the sector number. When the disk rotates, the head moves along the periphery thereof, passing the servo region and detecting and identifying the servo information. As it passes by, if the head overlaps the two phase servo bursts in the same way, the strength of the signals detected by the head from the two phase servo bursts will be the same, so that it is possible to know that the head is passing between the two phase servo bursts. In the case in which the head is displaced toward one of the two phase servo bursts, so that there is a ratio of strengths of the signal detected from the two phase servo bursts changes, it is possible to know toward which servo information the head is displaced. In servo systems in the past, feedback control was performed so that the head passed midway of the two phase servo bursts. Because control was performed so that the head moved along the circular servo track, the head moved along this circular servo track in a data region as well, and data recording was also performed along this circular servo track.

As noted above, while in the servo system of the past control was performed so that the head passed midway of the two phase servo bursts, where the strengths of the signals detected by the head from the two phase servo bursts were the same, it is also possible to perform control for each sector individually, so as to control the ratio of strengths of the signal detected by the head from the two phase servo bursts, so that the head describes a prescribed path. The inventor of the present invention, focusing on this, made it possible to perform control so that the head moves along a circular rotational path, which is a hypothetical circular path concentric with the rotation of the disk, even if the circular path (servo circular path) defined by the servo information recorded on the disk is eccentric with respect to the center of rotation. Even in the case of a combination of a plurality of disks and heads, because each head is controlled so as to move along a circular rotational path, access control is possible in the same manner as when there is no eccentricity. By doing this, even in the case in which a disk which has had precise tracks recorded onto it is assembled, it is possible to achieve a disk drive capable of high-speed access and high-accuracy positioning without the need to adjust the eccentricity to zero.

Further, when the head is controlled to move along a hypothetical circular path, the head is ideally retained to be stable. Therefore, a head positioning mechanism does not consume power. Then, power consumption of the disk drive can be reduced.

BRIEF DESCRIPTION OF THE DRAWINGS

The present invention will be more clearly understood from the description as set forth below, with reference being made to the accompanying drawings, wherein:

FIG. 19 is a waveform diagram which shows the generation of undulation caused by a servo signal.

DESCRIPTION OF PREFERRED EMBODIMENTS

Before proceeding to a detailed description of the preferred embodiments of the present invention, prior art disk drives will be described, with reference being made to the accompanying drawings relating thereto, for a clearer understanding of the differences between the prior art and the present invention.

Figure 1:
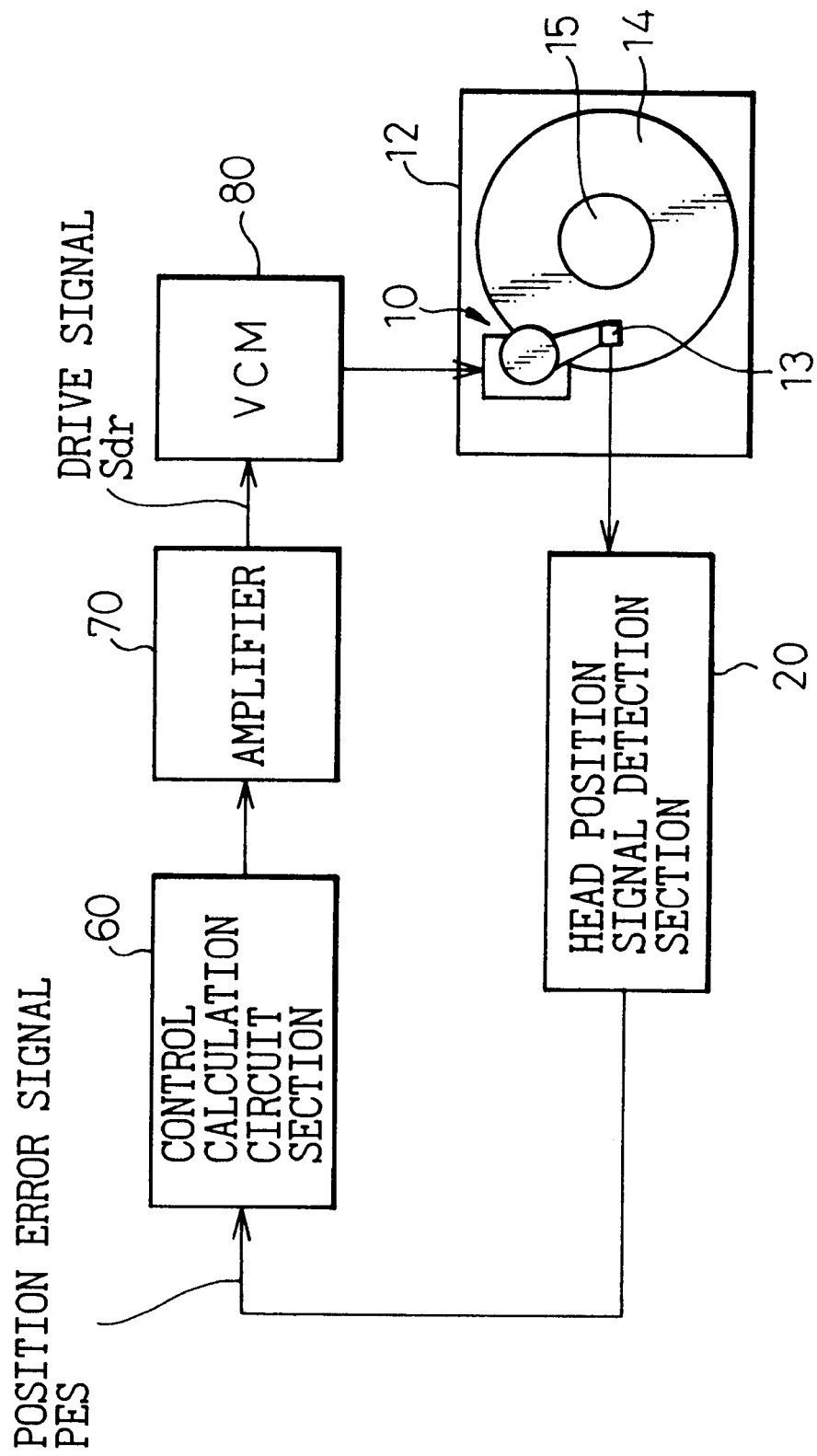
FIG. 1 is a control block diagram which shows the configuration of a head positioning control apparatus of the past.

FIG. 1 is a control block diagram which shows the configuration of a head position control apparatus of a disk apparatus of the past.

As shown in FIG. 1, in the disk apparatus, within the outer disk enclosure 12, a disk 14 (normally a plurality thereof) is mounted to a rotational hub of a spindle motor 15. Namely, the hub rotates about a fixed axis of the spindle motor. When the disk 14 rotates, the head 13 floats on a minute amount above the disk, because of air pressure. The head 13 is supported at the end of an arm that is free to rotate, and by rotating the arm it is possible to change the position of the head 13 over the disk 14 in the radial direction. Data recording is performed along circular tracks on the disk 14 which are concentric with the rotational center thereof. The writing and readout of data is performed when the head 13 is positioned over the target track by means of the actuator 10, and when the target sector rotates to the position of the head 13.

When a track is magnetically recorded, the magnetic data which indicates the track is read by the head 13, with tracking control performed so as to position the head over the target track. The signal which indicates the sector is also magnetically recorded on the disk, the head 13 reading magnetic data with regard to the sector so as to identify the sector. In this manner, there are two systems, the dedicated servo system in which the above-noted servo information is recorded onto a dedicated disk surface, and the embedded servo system in which the servo information is recorded together with data. An example of the latter, the embedded servo system, will be described below.

In the embedded servo system, servo information is recorded at the very beginning part of each sector. A head position signal detection section 20 extracts servo information from a signal that is detected by the head 13, a signal is generated which corresponds to the error in the position of the head 13 with respect to the track, this being inverted and input to a control calculation circuit section 60. At the control calculation circuit section 60, a signal is generated which compensates for this error, this being input as a drive signal Sdr, via an amplifier 70, to a voice coil motor 80. Thus, the head 13 is controlled so that it is positioned over the target track on the disk. In FIG. 1, only the control block for the purpose of positioning the head 13 over the track is shown, this drawing not showing the parts that perform such functions as identification of the track number from the servo information, causing the arm to rotate based on that signal, performing track switching control, and identifying the sector number from the servo information.

In the current state of the art in disk apparatuses, a disk is mounted to a rotating hub of a spindle motor 15, and servo information is written onto it by an STW (servo track writer) to perform track writing initialization. Writing and reading of data are performed after performing this initialization operation. In reality, an STW program is started and servo information is written onto the disk surface by a head. Thus, the path of a track is a circle which has as its center the center of rotation. This applies to both the embedded servo system and the dedicated servo system.

However, in reality because the head and disk are vibrating while the track is being written, the track is not a true circle, but rather vibrates about a circular path. In order to improve the recording density of a disk apparatus, it is necessary to increase the number of tracks that can be recorded on a disk. However, when the disk vibrates, because of the risk of mutual interference between adjacent tracks, it is not possible make the track spacing very narrow, thereby presenting an obstacle to the improvement of recording density.

As described above, in the method of the past in which tracks are written onto a disk after it is assembled into a disk drive, because it was not possible to make the track spacing very narrow, it was difficult to achieve a further improvement in storage capacity by increasing the recording density.

In consideration of the above-noted drawbacks, the inventor of the present invention envisioned the possibility of improving the recording density by assembling a disk onto a rotating hub after accurately recording the tracks using an external apparatus. However, when mounting a disk onto which tracks have been recorded to a rotational hub of a spindle motor, even if the mounting accuracy is improved, it is not possible to avoid some degree of eccentricity, with the center of the track being not in agreement with the center of rotation. Although it is possible to envision that adjustment can possibly make the eccentricity yet smaller, the required adjustment is extremely delicate, it being extremely difficult to achieve a sufficiently accurate adjustment, so that even if this were possible, the labor required to make the adjustment would present the problem of increased cost.

In an embedded servo system having a plurality of disk surfaces, it can be envisioned that it is sufficient to perform tracking control of just the head which is performing data writing or readout, and in the case in which feedback control is used so that the head under control tracks to the center of the track, when the head under control is switched to a different head, the switched head waits until tracking on the target track is achieved, and after tracking is achieved to the target track, data writing and readout are performed. However, this is accompanied by the problem of a lengthened access time when the head is switched.

According to the present invention, a disk drive and a disk drive head position control method are achieved which are capable of high-speed access, even if a track defined in terms of servo information is eccentric with respect to the center of rotation.

Figure 2:
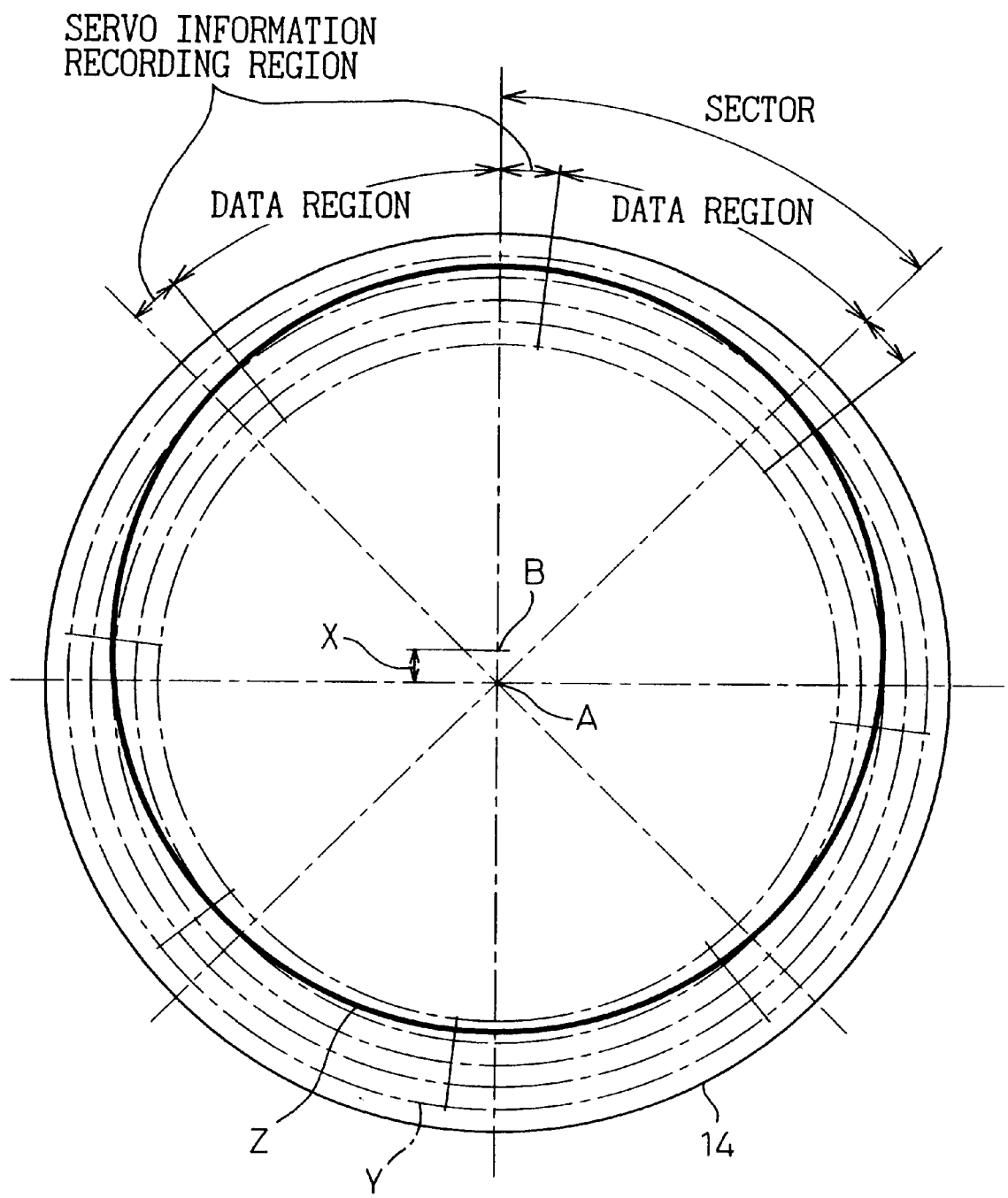
FIG. 2 is an illustration of the principle of the present invention.

FIG. 2 is a drawing which shows the principle of the present invention.

In FIG. 2, the reference symbol A denotes the center of concentric tracks which are defined by servo information which is recorded on disk 14 (hereinafter referred to as servo tracks), B is the rotational center when the disk 14 rotates, this being eccentric by the amount X. The surface of the disk 14 is divided into fan-shaped sectors, a servo information recording region existing at the beginning of each, the remaining area being a data region. The servo information recording region has recorded in it radial-direction position information in the same manner as in the information that indicated the track in the past, and if the position indicated by this position information is connected continuously, a circle Y concentric with the track as in the past is defined. We shall call this concentric circular path a circular servo track or a hypothetical circular path.

As noted above, because the center A of the servo circle Y is offset by X from the center of rotation B, a path that is a fixed distance from the center of rotation B is the circular path Z as shown in the drawing. This circular path Z shall be called the circle of rotation. A feature of the present invention is that tracking is performed along this circle of rotation Z.

Figure 3:
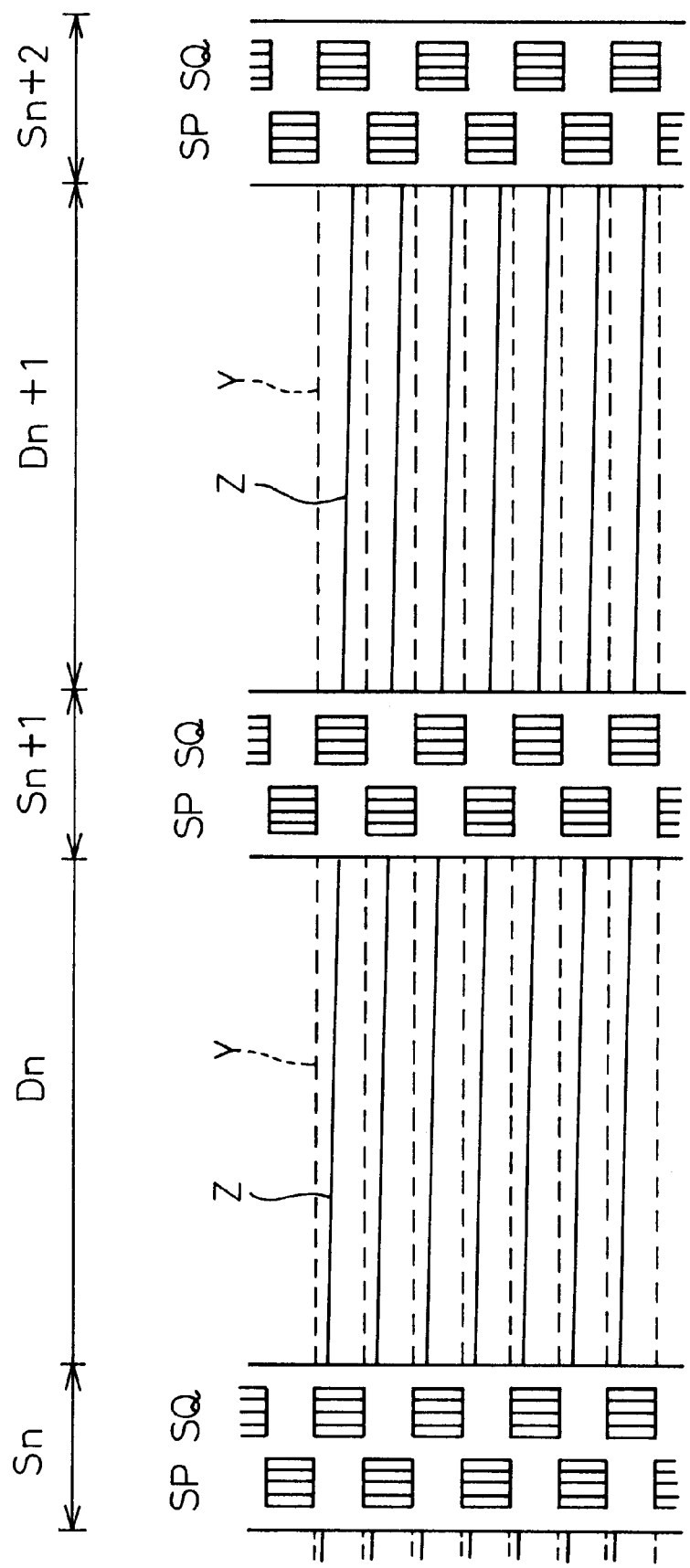
FIG. 3 is a drawing which illustrates the control principle based on the servo information in the present invention.

FIG. 3 is a drawing which shows the tracking control principle based on servo information in the present invention, this drawing being an enlarged schematic representation of the servo information region and data region parts. As shown in FIG. 2, the servo information recording region and data region are disposed on a circular circumference, but for the purpose of this description they are shown as being disposed along a straight line.

As shown in FIG. 3, the sectors comprise the servo information recording sectors Sn, Sn+1, and Sn+2 and the data regions Dn and Dn1. Two phase servo bursts, SP and SQ are recorded in the servo information recording regions. The phase servo bursts SP and SQ are radially offset and circumferentially staggered. The servo information SP and SQ include not only an indication signal that indicates that this is servo information, but also signals which indicate the track number and the sector number. As will be described later, it is also possible to record yet another servo information. When the disk rotates, the head moves circumferentially, so as to detect and identify the servo information SP and SQ when it passes the servo information region. In the case in which the head passes so that it is superposes over the SP and the SQ servo information in the same manner, the strength of the signals detected from the SP and SQ data are the same, making it possible to know that the head is moving between the SP and SQ servo information. When the strength ratio of the signals detected by the head from the SP and SQ servo information changes, it is possible to know that the head is displaced toward one or the other. In a servo system of the past, feedback control was performed so as to cause the head to pass between the SP and the SQ servo information, the head being controlled so that it moved along the broken-line paths. This is the above-noted servo track. Because feedback control is performed so that the head travels along this servo track, the head travels along this servo track in the data region as well, with data recording also performed along this servo track. In the servo system of the past, therefore, the track is the same as this servo track.

In the servo system in the past, control was performed so that the strength of the signals detected by the head from the SP and SQ servo information was the same, the head moving between the SP and SQ servo information, it is also possible to perform strength ratio control of the signals detected by the head from the SP and SQ servo information for each sector, and also possible to perform strength ratio control of the signals detected by the head as it passes SP and SQ information at different radial positions. The inventor, focusing on this point, made it possible to perform control so that the head moves along a circular rotational path, even if the circular path defined by the servo information recorded on the disk is eccentric with respect to the center of rotation. Even in the case of a combination of a plurality of disks and heads, because each head is controlled so as to move along a circular rotational path, access control is possible in the same manner as when there is no eccentricity. By doing this, even in the case in which a disk which has had precise tracks recorded onto it is assembled, it is possible to achieve a disk drive capable of high-speed access and high-accuracy positioning without the need to adjust the eccentricity to zero.

As noted above, in the case in which a disk, onto which servo information has been externally recorded, is assembled, because there is always eccentricity, the present invention is particularly effective. Even in the case of an apparatus in which servo information is recorded after the assembly of the disk, there are cases in which eccentricity can occur after assembly, due to aging and application of heat after writing of the servo information after assembly, the present invention being effective in this case as well, so that the present invention is not limited in usefulness to the case of a disk onto which servo information is written before assembly.

Figure 4:
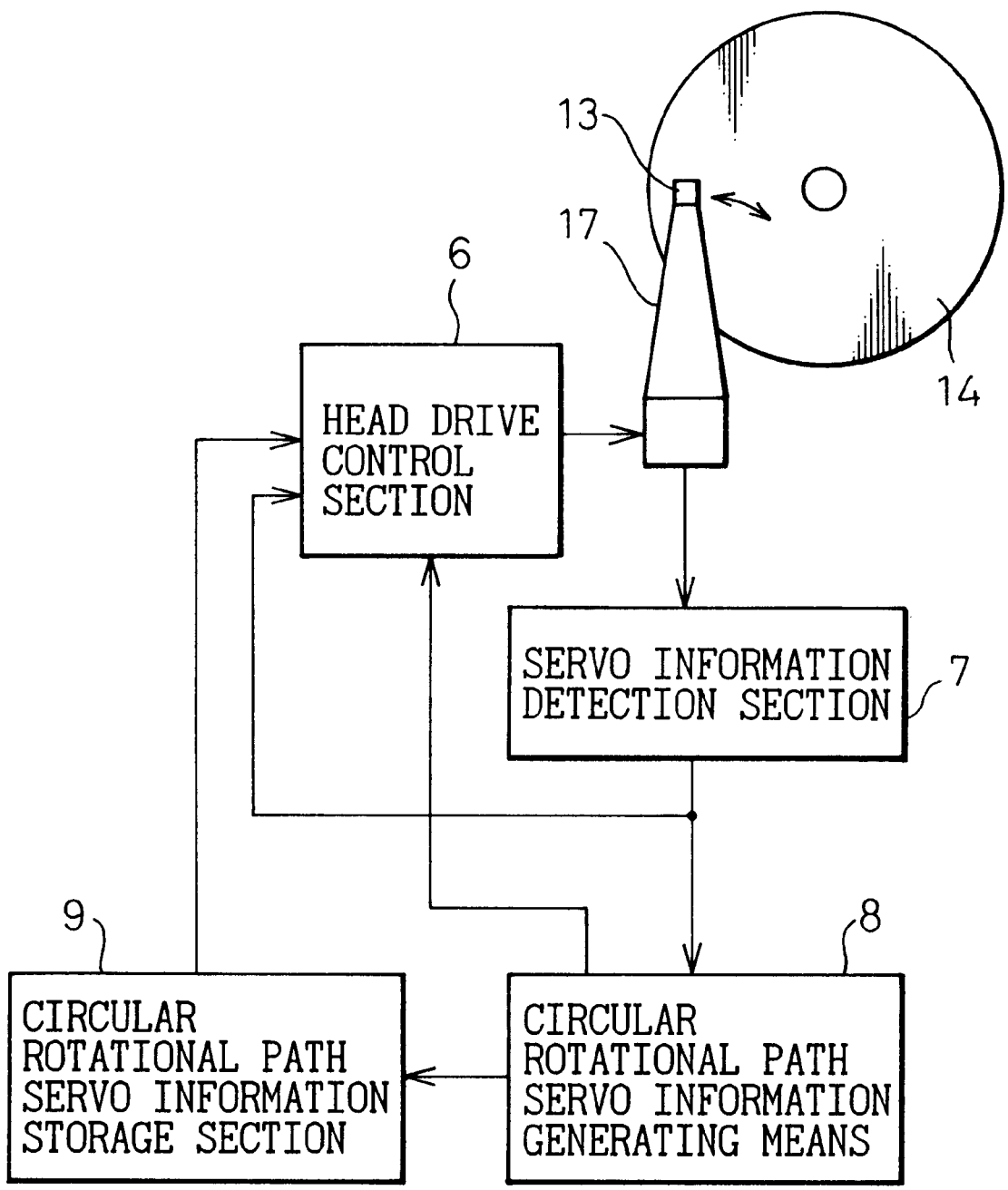
FIG. 4 is a drawing which shows the basic configuration of a disk drive according to the present invention.

FIG. 4 is a drawing which shows the basic configuration of a disk drive of the present invention.

To enable the above-noted servo control in the disk drive according to the present invention, the eccentricity of the servo track defined by the servo information, with respect to the center of rotation, is detected, servo information generating means being provided for the purpose of performing control so as to follow a circular track, and means for storing the thus-generated servo information is provided, the head being caused to move along a circular path by means of servo control, based on the servo information which is stored therein.

Specifically, the disk drive according to the present invention has a disk 14 which rotates about a center that is the center of rotation, a head 13 which detects information which is recorded onto the disk 14, a head moving means 17 which causes the head 13 to move so as to change its radial distance from the center of rotation above the disk 14, a servo information detecting means 7 for detecting servo information from the information detected by the head 13, and a control means 6 for controlling the head moving means 17 based on the detected servo information, the above-noted servo information specifying the servo circular path, which includes position information in the radial direction above the disk surface, the eccentricity of the servo circular path with respect to the circular rotational path about the center of rotation of the disk 14 being measured, there being further provided a circular rotational path servo information generating means 8, which generates circular rotational path servo information (head position adjusting information) for the purpose of controlling the head so that it travels along a circular path, and a circular rotational path servo information storage means 9 for storing the circular rotational path servo information which is generated by the circular rotational path servo information generating means 8, the control means 6 performing control of the head moving means 17 so that the head 13 travels along the circular rotational path.

In the case in which there are a plurality of disk recording surfaces and an accompanying plurality of heads 13, the circular rotational path servo information is measured and stored for each individual recording surfaces.

In the case of one disk recording surface, even if the head travels along a servo circular path that is eccentric with respect to the disk recording surface, there is no great problem. However, if control is performed according to the present invention so as to cause travel along a circular rotational path, because it is possible to make the head displacement for tracking small, there is the effect of improvement in the tracking accuracy.

In the example described with regard to FIG. 2 and FIG. 3, the disk 14 is divided into a plurality of sectors, with servo information being recorded on each sector individually. However, it is also possible to apply the present invention to, for example, a servo-surface servo system, in which case there is the effect of being able to make the above-noted head displacement for tracking small.

The circular rotational path servo information which is stored in the circular rotation path servo information storage means 9 can take various forms. For example, it is possible to simply store the amount of eccentricity of the servo circular path with respect to the circular rotational path and the rotational angle direction of the eccentricity, the control means 6 calculating the circular rotational path displacement position information to achieve a circular rotational path for each sector, based on this amount of eccentricity and rotational angle direction of the eccentricity, and controlling the head moving means 17 accordingly when performing servo control. In this case, it is possible to make the storage capacity of the circular rotational path servo information storage means 9 small.

However, with this form of circular rotational path servo information, it is necessary to calculate the rotational path servo information for a circular rotational path for each sector, thereby requiring a sophisticated calculation function. For this reason, it is possible to pre-calculate the movement information for the radial direction for the purpose of achieving a circular rotational path for each sector individually, this being stored in a circular rotational path position table. By doing this, it is not necessary to have a large storage capacity in the circular rotational path servo information storage means 9. It is also possible to store the radial-direction position information to achieve a circular rotational path as servo information for each sector individually.

There are various methods of measuring the eccentricity of the servo circular path with respect to the circular rotational path and generating the circular rotational path servo information for the purpose of control so that the head 13 follows a circular rotational path. For example, the disk can be rotated while the head 13 is pressed up against a holding means such as a carriage stopper or the like, the measurement being performed by having the head 13 detect the servo information on the disk 14. Additionally, it is possible to cause the disk 14 to rotate with the frequency bandwidth of the servo signal limited to less than the rotational speed of the disk 14, and under this condition detect servo information of the disk 14 using the head 13 so as to measure the eccentricity of the servo circular path with respect to the circular rotational path. Further, because the control signal for the VCM which performs control so that the head 13 follows the servo circular path, that is, the VCM current, drives the actuator, it is proportional to the acceleration of the actuator. Thus, if this is integrated twice, the displacement is obtained. Asynchronous components can be removed by taking the average of a number of rotations. It is also possible to maintain a circular servo path by applying the inverse model of the sensitivity function of the control loop to the PES (position error signal) when performing this type of control.

The writing of data onto the disk 14 is performed along a circular rotational path within the data region. However, it is possible to perform control which causes the head 13 to follow a circular rotation path only during the idle period in which data is being neither written to or read from the disk 14, with data being written to the disk 14 along the servo circular path. In this case, when performing data writing and readout, it is necessary to perform the writing to and reading from the disk of data after performing control so that the head follows the servo circular path. In the case of a plurality of disks, however, considering variations between the individual servo circular paths, the switching time between the heads of interest having the largest difference in servo circular path will be large, this switching time limiting the access time. In contrast to this, if the control which causes following of the circular rotational path is performed during the idle time, the maximum time to switch to the head of interest can be made small.

For this reason, the eccentricity of the servo circular path with respect to the disk 14 recording surface circular rotational paths for each pair of heads is measured, control so as to follow the amount of eccentricity being performed between a grouping of a disk 14 and a head 13 which has an amount of eccentricity that is close to the average of the eccentricities of the plurality of groups, this being performed during the idle time.

It is also possible to perform compensation not only for the eccentricity of the servo circular path, but also for frequency components of the difference between the servo circular path and the rotational circle which are of an order that is higher than the disk rotational speed. In general, tracking characteristics of a control system are worse at high frequencies than at low frequencies. For example, for a rotational speed component, in comparison with an approximate −24 dB error compression, because there is an increase in the error in the region of the servo loop zero crossing frequency, high-frequency compensation is effective. It is desirable that the high-order frequency components be limited to an upper limit of no higher than ¼ of the sector sample frequency. The measurement of high-order frequency components is performed by passing the head position detection signal, which indicates the position of the head 13, through a filter which removes therefrom frequencies that are less than twice the frequency of the rotational frequency of the disk 14. While the filter normally used in a head positioning control system is an IIR (infinite impulse response) filter, it is desirable that the filter used be a digital FIR (finite impulse response) filter that has linear phase characteristics, and which does not cause phase distortion between its input and output. Specifically, because (n+1) data of an n-th order FIR filter are used, it is sufficient to restore the filtered results with n/2 sampling. To extract high-order frequency components, measurement is possible by extracting only frequency components of the prescribed frequency range in the position error signal, with the tracking control loop bandwidth (open-loop zero-crossing frequency) limited to a frequency that is lower than the rotational frequency of the disk. In this case, the cutoff frequency of the filter is higher than the rotational frequency, and is desirably less than twice that frequency. In addition, when measuring high-order frequency components, if the servo track spacing which is limited by the servo information is L, because the position information derived from one servo boundary is valid over the range of ±L/2, it is desirable that the head 13 be controlled so as to be within range of ±L/2 with respect to the servo track.

On the other hand, in the case in which servo information is externally recorded, it is possible to record servo information with extremely good accuracy, so that high-order frequency components are scarcely generated. For this reason, if the head is caused to track for only a displacement having a period that is the same as that of the rotational frequency in accordance with the eccentricity, it is possible to achieve more accurate positioning. Thus, it is desirable that a filter be provided which removes frequency components from the position error signal, to be fed back to the head moving means 17, which are higher than twice the rotational frequency.

Figure 5:
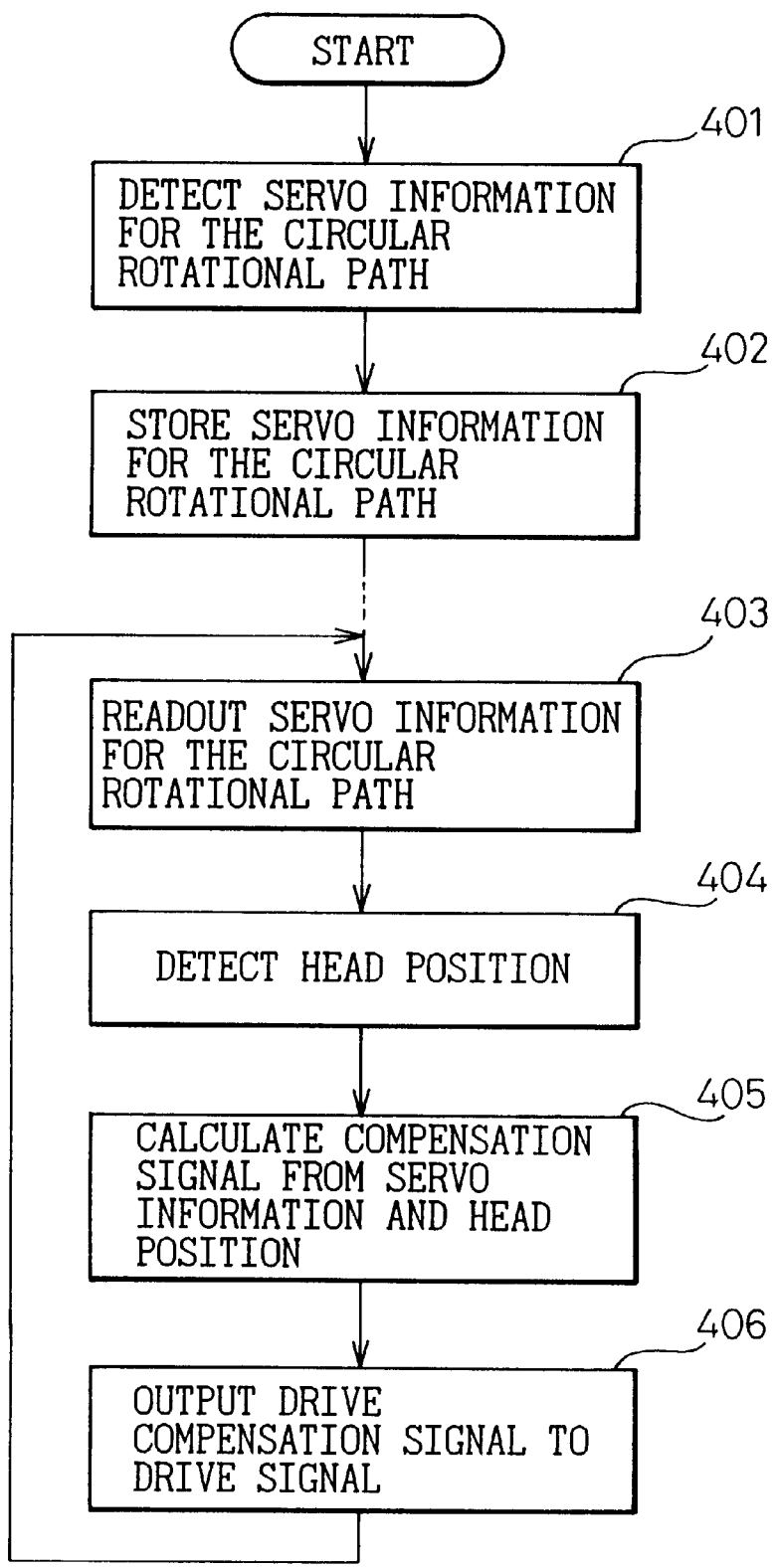
FIG. 5 is a drawing which shows the basic configuration of a disk drive control method according to the present invention.

FIG. 5 is a flowchart which shows the configuration of the head positioning control method for a disk drive according to the present invention.

The disk drive head position control method according to the present invention is a method of controlling the position of a head in a disk drive over a disk which is rotating about a center of rotation and which has recorded onto it servo information which specifies a servo circular path, including radial-direction position information, this method having, as shown in FIG. 5, a circular rotational path servo information generating step in which the eccentricity of the servo circular path with respect to the circular rotational path having as its center the center of rotation of the disk is measured, and in which circular rotational path servo information is generated for the purpose of performing control so that the head follows the circular rotational path (step 401), a step in which the above-noted circular rotational path servo information is stored (step 402), a step, after the above-noted steps are completed, in which the circular rotational path servo information is read out (step 403), a step in which the head position is detected from the position information of the servo information (step 404), a step in which a compensation signal is calculated from the circular rotational path servo information and the head position (step 405), and a step in which control is performed so that the head follows along the circular rotational path, based on the above-noted compensation signal.

Figure 6:
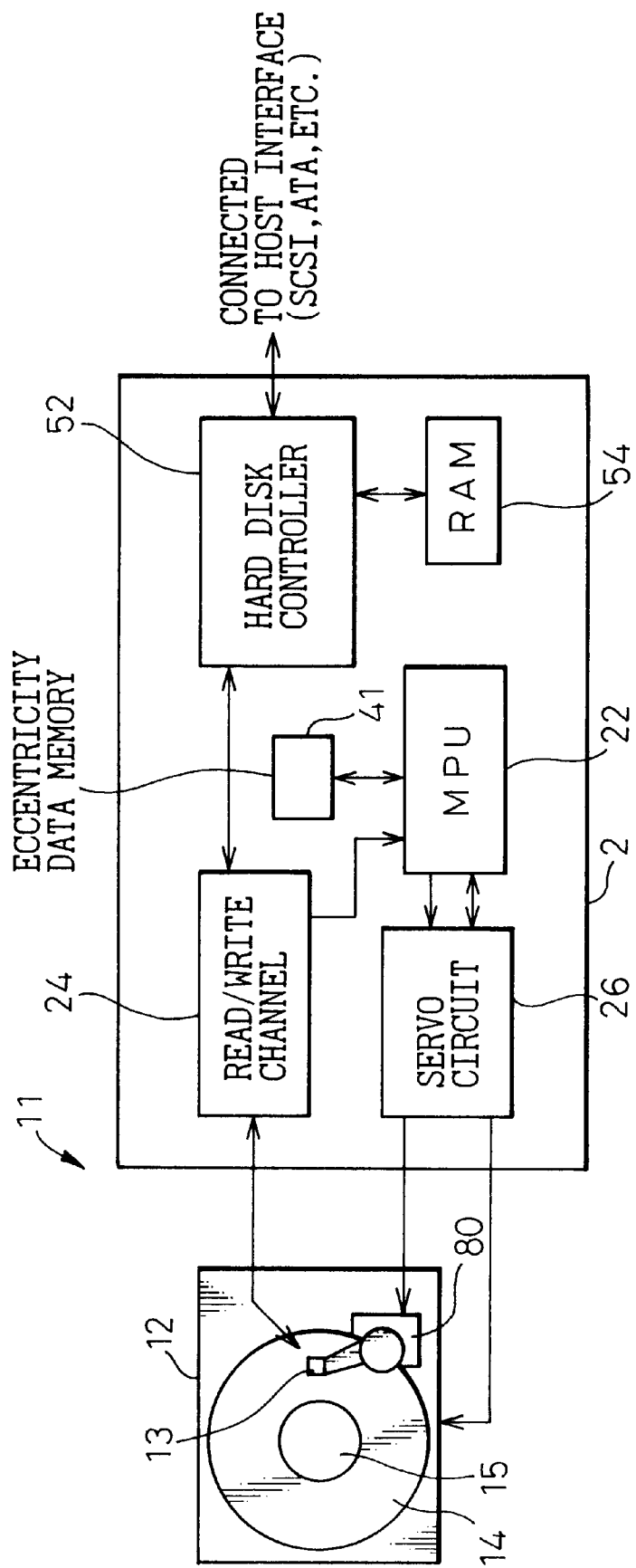
FIG. 6 is a block diagram which shows the configuration of an embodiment of a disk drive according to the present invention.

FIG. 6 is a block diagram which shows the configuration of a disk drive of an embodiment of the present invention, which is described below.

As shown in FIG. 6, the mechanism part of the disk drive 11 has, within the outer disk enclosure 12, a rotating disk (normally a plurality thereof) 14 mounted to the rotating hub of a spindle motor 15. When the disk 14 rotates, the head 13 floats a minute amount above the disk, because of air pressure. The head 13 is supported at the end of an arm that is free to rotate. While not shown in the drawing, there is a plurality of disks 14, all of which are mounted to the rotating hub of the spindle motor 15, and which rotate. The storage of data is performed with respect to both surfaces of the disk, and a head 13 is provided for each of the surfaces of each of the disks. All the heads 13 are supported by a common moving mechanism (actuator) 80, and move simultaneously and in concert. In addition, each disk 14 has servo information externally recorded onto each surface of it, after which it is mounted to the rotating shaft of the spindle motor 15. The mechanism is controlled by a control section 2.

The control section 2 has a microprocessor (microcomputer) 22, a read/write channel 24, a servo circuit 26, an eccentricity data memory 41, a hard disk controller (LSI device) 52, and a RAM 54, which is used as a data buffer. The signal input/output section of the read/write controller 24 is realized by a multiplexer, switching being done to establish from which head a detection signal is to be input. Which disk surface of the plurality of disk surfaces with respect to which writing or reading of data is to be performed is established by the multiplexer, which selects from which head a signal is to be input. This configuration is the same as in the past, and what differs is the provision of the eccentricity data memory 41. Features that are the same as in the past, therefore, will not be described herein, the description focusing on the differences therefrom.

The eccentricity data memory 41 is a memory into which is stored the amount of eccentricity of the servo circular path with respect to the circular rotational path. Because it is necessary to hold the eccentricity amount and phase which are stored upon initialization until initialization is performed once again, even if the power is removed, it is desirable that a non-volatile memory such as an EPROM or $E^2PROM$ be used as this eccentricity data memory 41.

Figure 7:
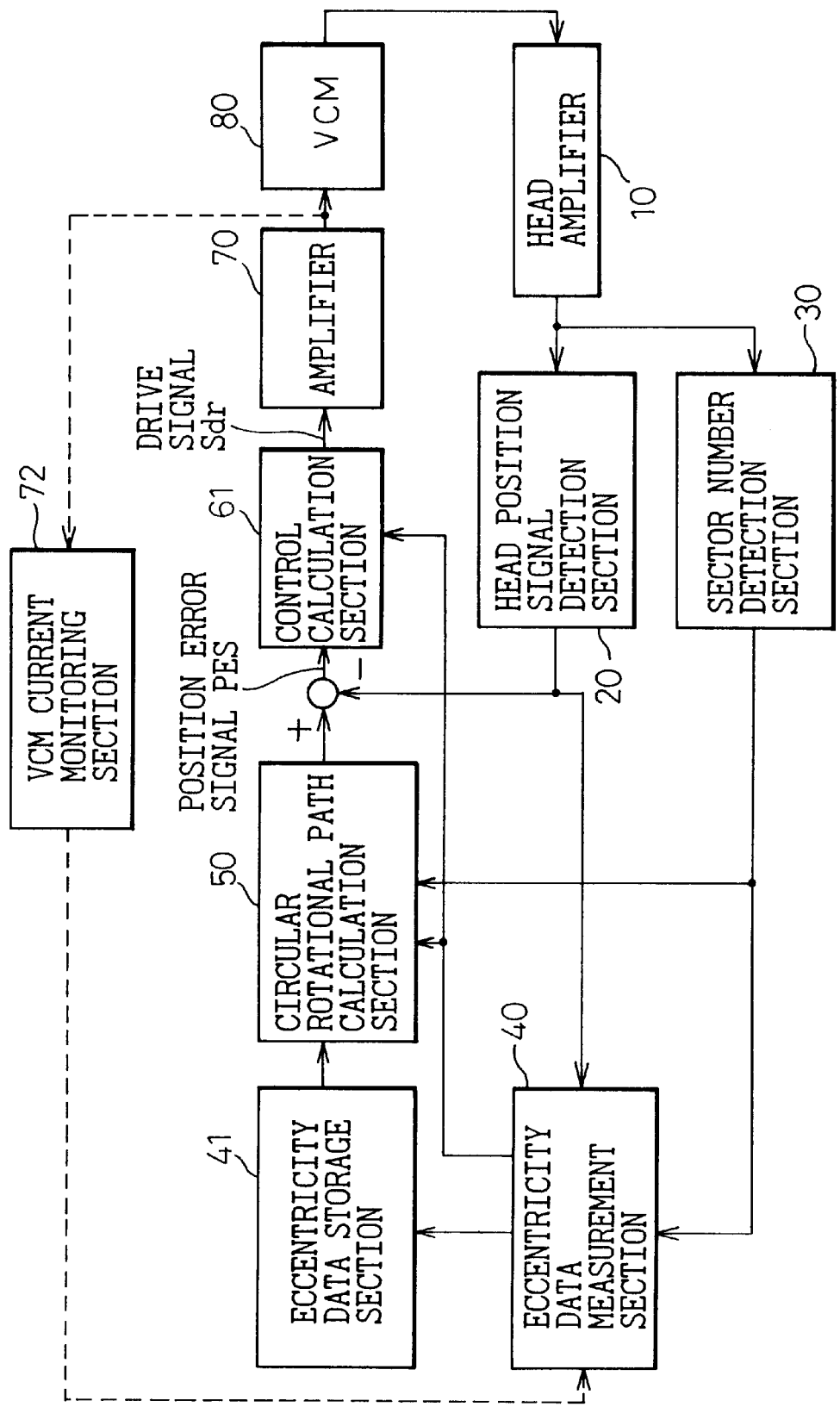
FIG. 7 is a control block diagram which shows the configuration of the first embodiment.

FIG. 7 is a block diagram which shows the configuration of the tracking control section of the first embodiment.

As shown in FIG. 7, the head amplifier 10 amplifies the magnetic data which is stored on the disk and detected by the head 13, and outputs this as a detection signal. The head position detection circuit 20 identifies the servo information which is stored in the servo information recording region from the detection signal, detecting what servo track the current position is, and outputting a head position signal. Additionally, as described with regard to FIG. 2, from the ratio of strengths of the two phase servo bursts, SP and SQ, which are recorded in the servo information recording region, in the case in which the position is between adjacent servo tracks, it is possible to detect at what type of intermediate position this position is. For example, if the interval between the 50th and the 51st tracks is divided into 10 parts and the position is 2/10 of the way from the 50th track, a signal is output which indicates the head position such as 50.2. The sector number detection section 30 identifies the servo information from the detection signal output by the head amplifier 10, and outputs a signal which indicates the sector number being passed. The head position signal is input to an adder/subtractor circuit, at which the difference with respect to the target track is calculated, this being the position error signal PES. The position error signal PES is input to the control calculation circuit section 61, at which a drive signal Sdr that controls the head so as to be positioned at the center of the target servo track is generated from the head position signal, this being output to an amplifier 70. The drive signal Sdr, after being amplified by the amplifier 70, is applied to the voice coil motor (VCM) 80, thereby causing the head 13 to move. The above is the same as in a control section in the past, and in examples in the past a signal which indicates the target track is input to the adder/subtractor circuit. For this reason, control is performed so that the head is positioned over the center of the target track.

In the first embodiment, there is the additional provision of an eccentricity data measurement section 40, an eccentricity data storage section 41, and a circular rotational path calculation section 50. In addition, a VCM current monitoring section 72 is provided, which monitors the output signal of the amplifier 70.

The eccentricity data measurement section 40 is implemented by the MPU 22 shown in FIG. 6, and controls the circular rotational path calculation section 50 and the control calculation circuit section 61, performing control of the head 13 in a prescribed condition for the purpose of measuring the eccentricity data, a head position signal and a signal which indicates the sector being detected so as to measure amount of eccentricity and angle of eccentricity of the servo track with respect to the rotational center, the results being stored in the eccentricity data storage section 41. From the amount of eccentricity and angle of eccentricity stored in the eccentricity data storage section 41, the circular rotational path calculation section 50 generates a signal for the purpose of performing control of the head 13 so that it describes a circular path about the center of rotation, this signal being output to an adder/subtractor. By doing this, the head 13 is controlled so as to describe a circular path having its center at the center of rotation.

Next, the process of measuring the amount of eccentricity and angle of eccentricity of the servo track with respect to the center of rotation will be described.

Figure 8:
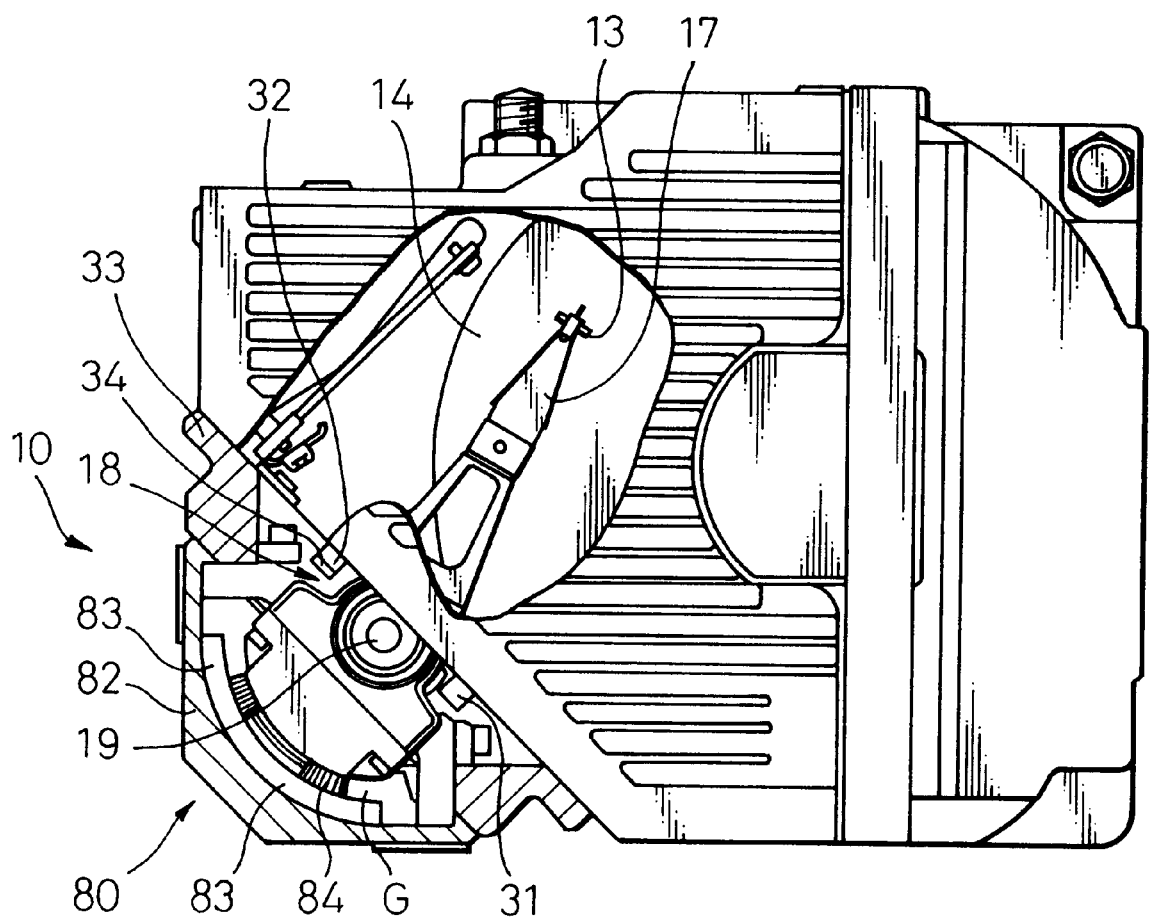
FIG. 8 is an plan view which shows an example of a disk apparatus which is provided with a carriage stopper that is used to establish the amount of and direction of eccentricity in the first embodiment.
Figure 9:
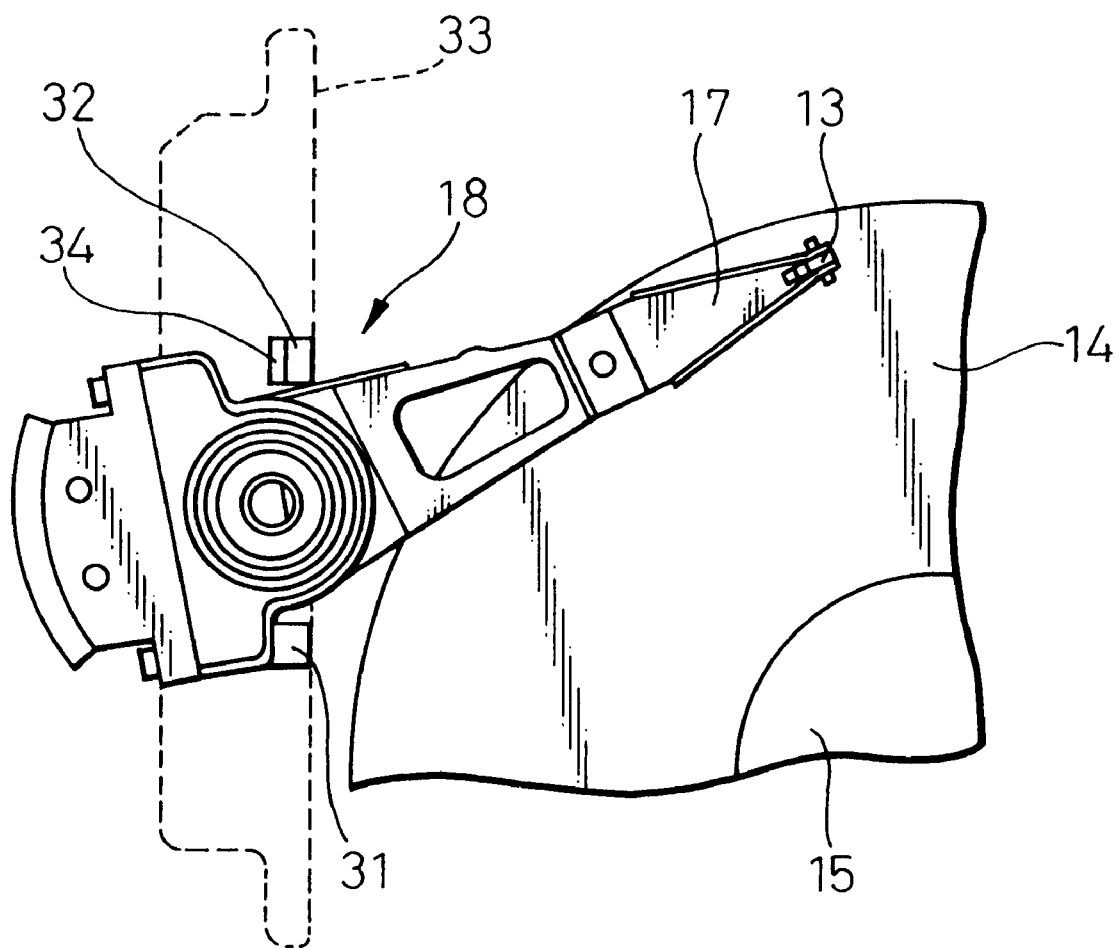
FIG. 9 is an enlarged plan view presented to illustrate the operation of the carriage stopper.

FIG. 8 is a plan view which shows an example of a disk drive in which is provided a carriage stopper which is used in the measurement of the amount of eccentricity and the angle thereof in the first embodiment of the present invention, and FIG. 9 is an enlarged plan view for the purpose of illustrating the operation of this carriage stopper.

The carriage stopper which is shown in FIG. 8 and FIG. 9 was disclosed in Japanese Unexamined Patent Application Publication (Kokai) H7-73614, this not only enabling compression operation, but also, to improve stopper positioning accuracy, making use of an inner stopper 32 made from a resilient material and an outer stopper made of metal. While no further detail will be described herein with regard to the stopper that is shown in FIG. 8 and FIG. 9, in the first embodiment, because with the carriage stopper shown in FIG. 8 the outer stopper 31 is made of a metallic material, when the carriage is made to come into contact with the outer stopper 31 as shown in FIG. 9, the head 13 is held fixed, and this stable fixed position is used to hold the head accurately at a fixed position. In this condition, the disk 14 is caused to rotate, and the head position signal when passing by each sector is detected. That is, the coordinates values of the circular rotational path when the head 13 is held fixed and the disk 14 is caused to rotate are measured in terms of the servo track coordinates that are recorded on the disk. Stated in reverse, if control is performed so that the head 13 passes by these coordinate values in servo track coordinates, it will describe a circular path of rotation having the center of rotation as its center.

Figure 10:
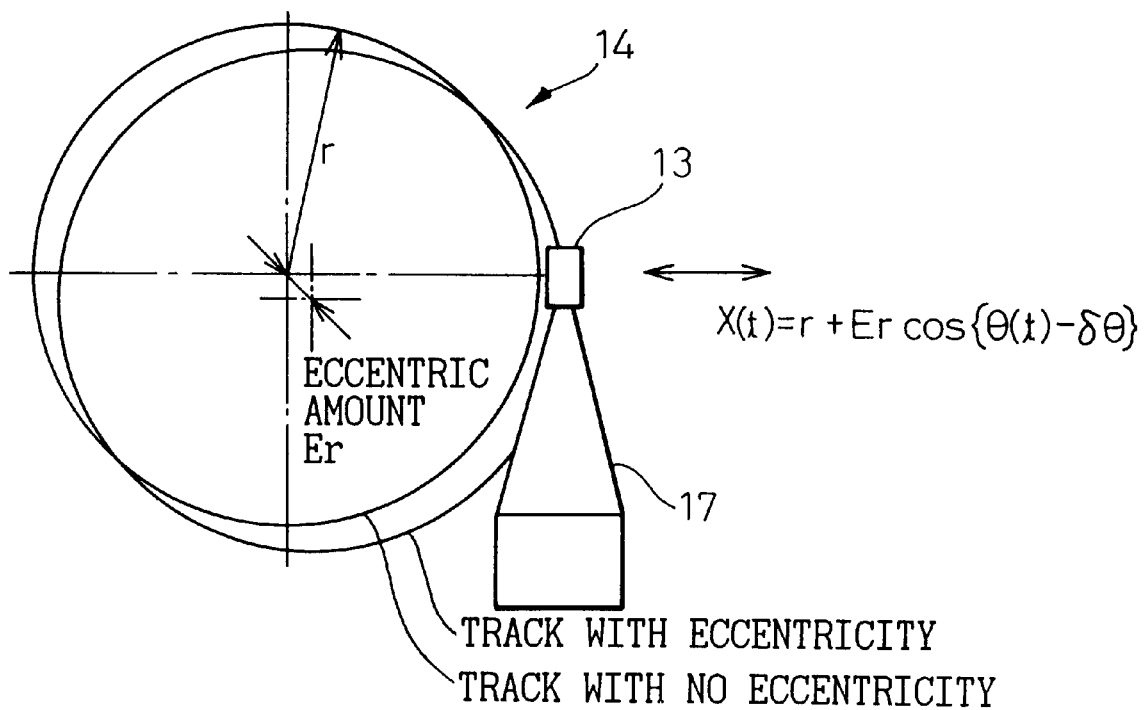
FIG. 10 is a plan view which shows a simplified view of the positional relationship between a track and a head between which there is eccentricity.

From the measured coordinate values, the amount and angle of eccentricity of the servo track (servo circular path) with respect to circular rotational path are calculated. FIG. 10 is a plan view which shows a simplified view of positional relationship between a servo track having eccentricity and a head. The calculation of the amount and angle direction of eccentricity is explained below, with reference being made to this drawing.

With the 0th sector taken as the direction of 0°, the servo track, with respect to the center of rotation, has an eccentricity of Er at an angle of δθ. Under this condition, with the head 13 held at a position that corresponds to the radius of the r-th track and the disk 14 rotating, the head position signal X(θ) varies in accordance with the following Equation (1), with the rotational position of the head being θ.

$$X(\theta) = r + Er \cos(\theta - \delta\theta) \quad (1)$$

Therefore, in the case of performing tracking control so as to track to the servo track, if a signal as expressed by Equation (1) is added to the drive signal, the head will describe a circular path of rotation having a center at the center of rotation.

Table 1 below shows the startup amount of compensation for the 8th track for the case of a disk divided into 12 sectors around its periphery, an amount of eccentricity that is 2 tracks, this eccentricity being at a position of 45°.

TABLE 1

Calculation Example
Er = 2 tracks
δθ = 45°
R = 8 tracks (track #8)
B = R + Er × cos (θ−δθ)

| Sector No. | θ | Hypothetical Track Path R | Target Path B on the Physcial Track | Amount of path compensation (θ−δθ) |
|---|---|---|---|---|
| 1 | 0° | 8 | 9.4142 | 1.4142 |
| 2 | 30 | 8 | 9.9319 | 1.9319 |
| 3 | 60 | 8 | 9.9319 | 1.9319 |
| 4 | 90 | 8 | 9.4142 | 1.4142 |
| 5 | 120 | 8 | 8.5176 | 0.5176 |
| 6 | 150 | 8 | 7.4828 | 0.5172 |
| 7 | 180 | 8 | 6.5858 | −1.4142 |
| 8 | 210 | 8 | 6.0681 | −1.9319 |
| 9 | 240 | 8 | 6.0681 | −1.9319 |
| 10 | 270 | 8 | 6.5858 | −1.4142 |
| 11 | 300 | 8 | 7.4824 | −0.5172 |
| 12 | 330 | 8 | 8.5176 | 0.5176 |

Figure 11:
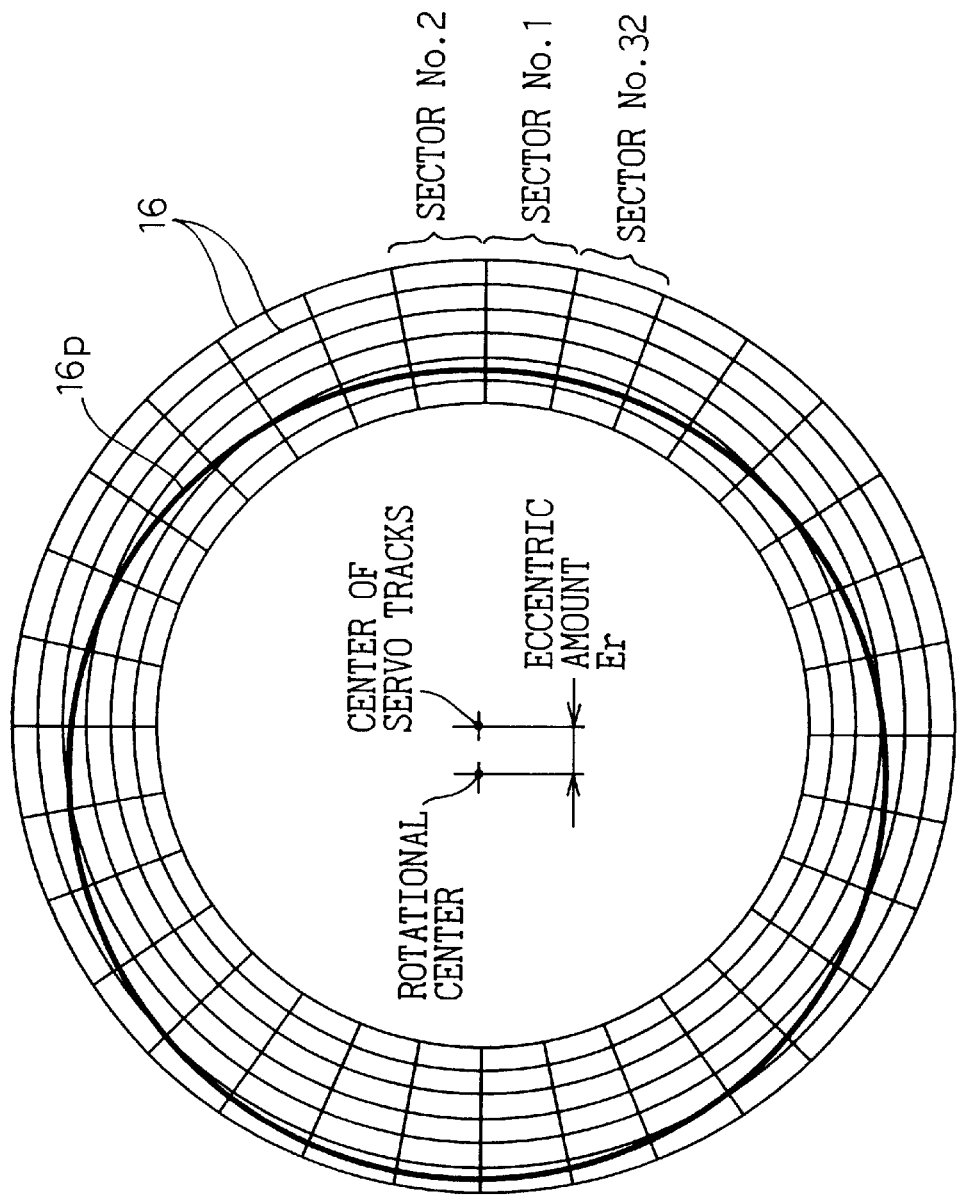
FIG. 11 is a schematic view which shows the relationship between an eccentric track and the rotational circle.

FIG. 11 is a schematic view which shows the relationship between an eccentric servo track and the circle of rotation.

In the first embodiment, writing of data is performed along the circular path indicated as the thick line in this drawing. A single circular path along which data is written, will be called a data track.

Figure 12:
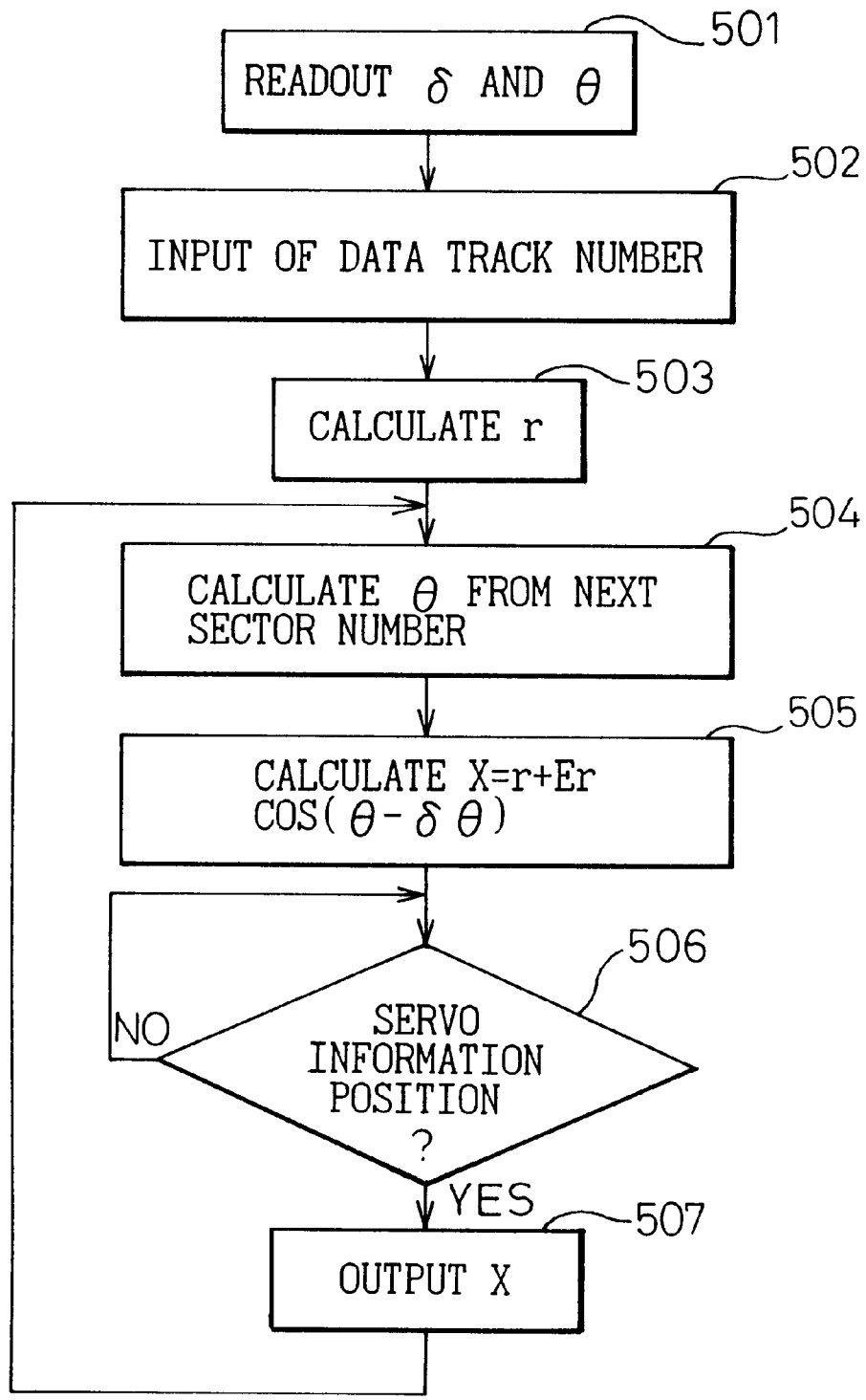
FIG. 12 is a flowchart which shows the control operation of tracking one and the same data track.

FIG. 12 is a flowchart which shows the control operation in the MPU 22 for the case of tracking for one and the same data.

In step 501, the amount of eccentricity Er and the angular direction δθ thereof are read out from the eccentricity data storage section 41. At step 502, the data track number for tracking is input, and at step 503 the value of r in Equation (1) is calculated from the data track number.

At step 504, θ is calculated from the next sector number after the sector number of the current position. At step 505, the value of X at the angle θ is calculated in accordance with Equation (1). At step 506, detection is made of whether or not the next servo region has been entered and a wait is made until this next servo region is entered. When the servo region is entered, at step 507 a drive signal corresponding to X is output. When this is done, the head position signal is also detected, a signal corresponding to the difference with respect to the target position being fed back, and control being performed so as to achieve tracking to the target data track. Other servo information such as the sector number is also simultaneously read out. By repeating steps 504 through 507, tracking to the target data track is performed.

Because the servo information is recorded in the servo region of each of the sectors, while it is only possible to detect the head position signal, for example, intermittently, because disk normally has from 32 to 64 sectors, if the response speed is appropriately set, no particular problem arises, as long as the previous control signal is substantially maintained until the next sector. This is similar to apparatuses in the past.

Figure 13A:
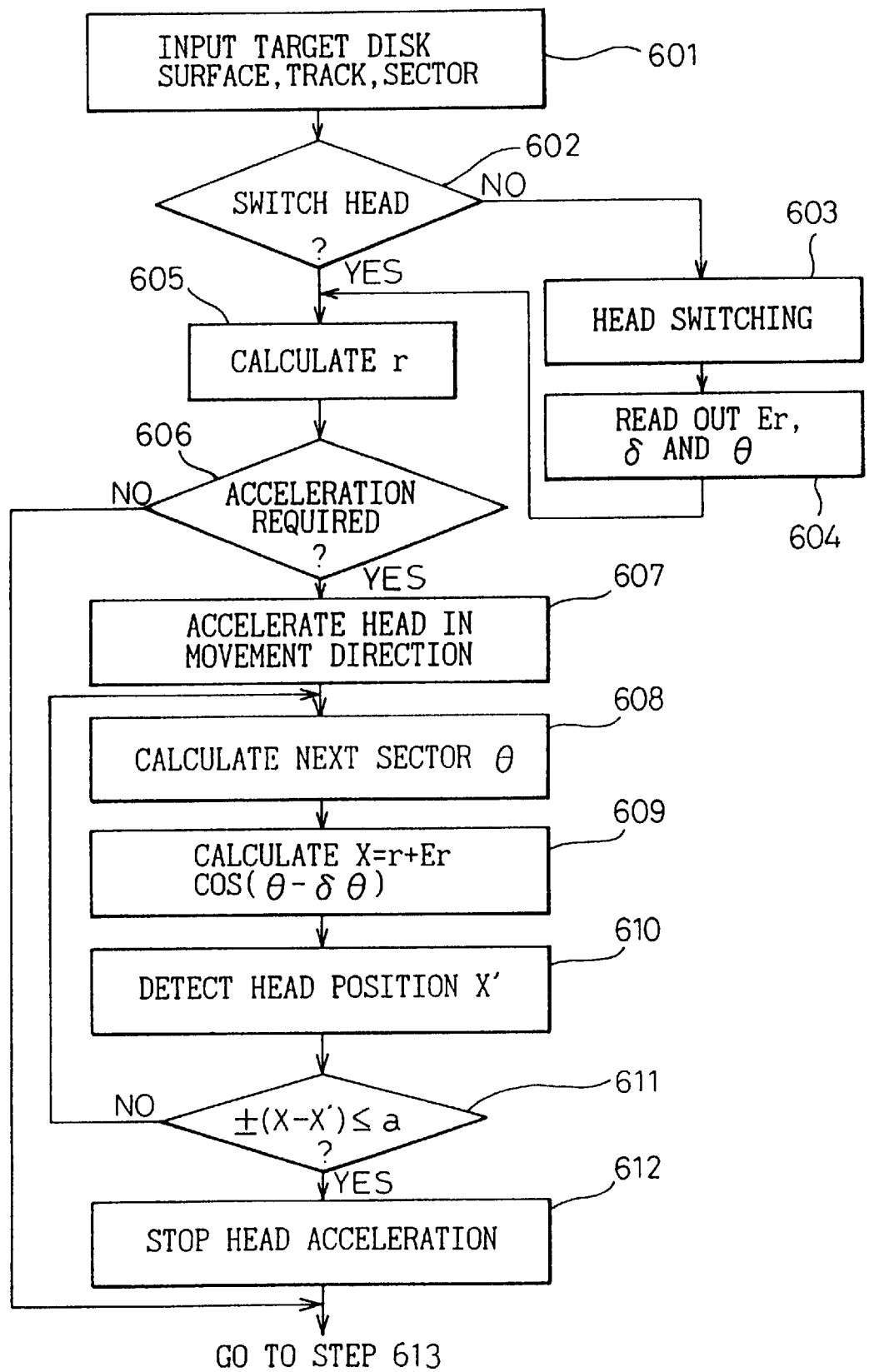
FIG. 13A and FIG. 13B are parts of a flowchart which shows the seek control in the first embodiment.
Figure 13B:
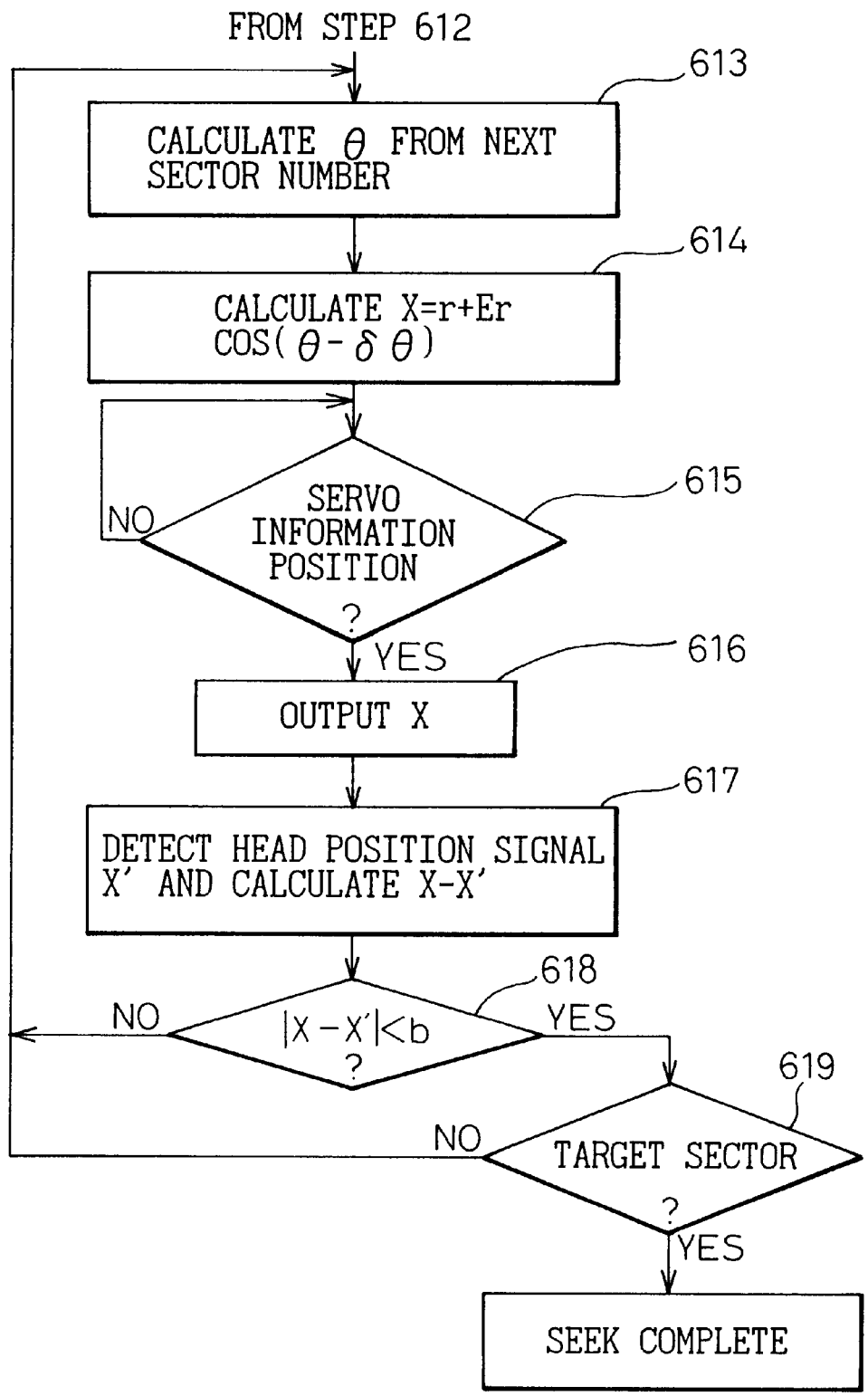

In the flowchart shown in FIG. 12, the description is that of the case of tracking to one and the same data track. Next, the case of seek control for access to different data tracks will be described. FIG. 13A and FIG. 13B are a flowchart which shows the control operation for seek control in the first embodiment of the present invention.

In step 601, the target disk surface, data track, and sector are input. In step 602, a judgment is made as to whether or not head switching is required. If it is necessary, a signal is switched to the head for reading at step 603, and at step 604 the eccentricity amount Er and direction δθ thereof are read out, after which control proceeds to step 605. At step 605, r is read out, and at step 606 a judgment is made as to whether or not acceleration is required for movement of the head. If the difference between the previous r and the calculated r is small, acceleration is not required.

In the case in which acceleration is required, at step 607 acceleration is made in the head movement direction. At step 608, the θ of the next sector is calculated, and at step 609 X is calculated in accordance with the Equation (1). At step 610, detection of the passage of the head by a servo region is made, to detect the head position X'. At step 611, a judgment is made as to whether or not the difference between X and X' is smaller than a prescribed value a, steps 608 to 611 being repeated until it is smaller than a. When the difference between X and X' becomes smaller than a, that is, when the target data track is near, at step 612 the acceleration is stopped. In the case in which acceleration is not required, a start is made from this point.

Steps 613 through 616 are the same as the control shown in FIG. 12, the difference with respect to the target data being fed back and tracking being performed to the target track. At step 617, the difference with respect to the target track is calculated, and at step 618 a judgment is made as to whether or not that difference is smaller than a second prescribed value b. This value of b is established based on the difference between the head and the data track for normal data writing or readout. When the head position approaches sufficiently close to the target data track, at step 619 a judgment is made as to whether or not this is the target sector. A wait is performed until the target sector arrives and, at the point at which the target sector is encountered, the seek is completed and the writing or readout of data begins.

The above has been a description of the first embodiment of the present invention. In the first embodiment, only the amount and angular direction of the eccentricity of the servo circular path with respect to the circular rotational path are stored as servo information for the purpose of performing tracking to a circular rotational path having a center that is the center of rotation, the compensation values for each data track and sector being calculated, and added to the feedback signal. By doing this, although the storage capacity for circular rotational path servo information is small, the time required to calculate the compensation values is long. Because of this, in the second embodiment of the present invention the compensation values are pre-calculated and stored, these being read out and added to the feedback signal.

Figure 14:
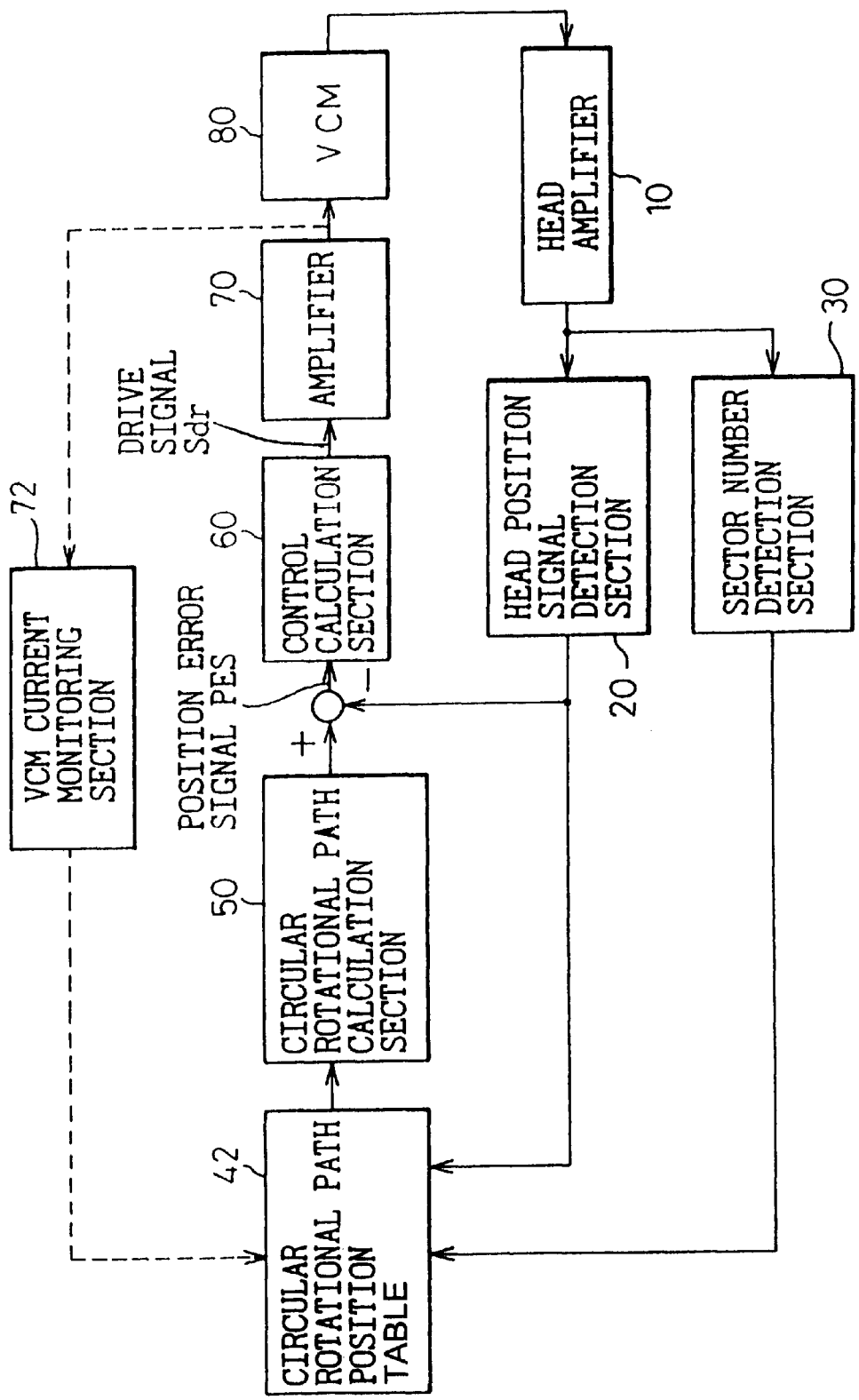
FIG. 14 is a control block diagram which shows the configuration of the second embodiment.

FIG. 14 is a control block diagram which shows the configuration of the control section of the second embodiment of the present invention.

As is clear in comparison with FIG. 7, in place of the eccentricity data storage section 41, a circular rotational path position table 42 is provided. In the second embodiment as well, there is an eccentricity data measurement section provided for the setting of various sections for the purpose of measuring the eccentricity data, but this is omitted herein.

In the second embodiment, similar to the first embodiment, the eccentricity data measurement section (not shown in the drawing) detects a head position signal with the disk rotating and the head held fixed by a carriage stopper. As already described, when this is done the head position signal can be thought of as a servo signal for the purpose of causing the head 13 to describe a circular rotational path about a center which is the center of rotation. As shown in FIG. 14, a relationship is set up between this and the sector number which is detected by the sector number detection section 30, the head position signal being stored in the circular rotational path position table 42. the values stored therein are values of Equation (1) with r removed.

At the time of initialization, after the above-noted storage of circular rotational path servo information, to access a target data track for the purpose of data writing or readout, the value of r which corresponds to the target data track is calculated at the circular rotational path calculation section 50, to which is added the value of $Er \cos(\theta - \delta\theta)$ output from the circular rotational path position table 42 in response to the target data track, this being output to the adder/subtractor circuit. The other parts are the same as in the first embodiment.

The servo signal for the purpose of describing a circular rotational path can be stored in the circular rotational path position table 42 for each sector, the servo signal for the purpose of describing a circular rotational path being read out when the head passes by the servo region, and output to the circular rotational path calculation section 50. If this is done, there is no need for the circular rotational path position table 42, it being sufficient to output the servo signal for the purpose of describing a circular rotational path from the head amplifier 10 to the circular rotational path calculation section 50.

Circular rotational path servo information that is once stored is always required when either reading out written data or writing data, and must be held even if the power to the disk apparatus is removed. While there is no problem if the above-noted circular rotational path servo information is stored for each sector stored in the circular rotational path position table 42, it is necessary to use a non-volatile memory such as an EPROM or an $E^2PROM$. If circular rotational path servo information is pre-stored to a system data cylinder (to which the user does not have access), this can be read when the disk apparatus is started, thereby eliminating the need for the memory 41 to be a non-volatile memory.

As already described, in the case of a plurality of disks, writing of data along the center of a servo track can be envisioned, in which case a problem is the reduction of seek speed in the case of switching the head. In general, input and output of information to a disk is done in units of computer files. The information in a single file is normally stored on a single disk. For this reason, when performing input and output of the data related to one file, there is almost never a switch to a different head. A switch to a different head occurs when a separate file is started after an idle period, during which input and output are not performed, occurs after the input/output of data by a given head is completed. For this reason, a reduction of seek speed due to head switching becomes a problem when a file is started from the idle condition. Because of this, in the first and second embodiments of the present invention, it is only during the idle time that control is performed so that the head describes a circular rotational path having its center at the rotational center, with data writing being performed along a servo track that is defined by servo information.

In this case, it is not necessary to have the circular rotational path have the center of rotation as its center, it being possible to obtain the same effect, for example, by measuring the eccentricity of the servo circular path with respect to the circular rotational path for pairs of disk recording surfaces and heads, and performing control in the idle period between a grouping of a disk and a head of the plurality of such pairs which has an amount of eccentricity that is close to the average of the eccentricities.

As described with regard to FIG. 8 and FIG. 9, in the first embodiment of the present invention, the servo track eccentricity is measured by detecting the head position with the carriage making contact with a carriage stopper so as to hold the head fixed. The eccentricity of the servo track can be measured by other methods as well. For example, it is possible to measure the eccentricity of the servo track with respect to the circular rotational path by causing the disk 14 to rotate and detecting the head position with the control bandwidth (open-loop zero-crossing frequency) of the servo that controls the position of the head 13 limited so as to be below the rotational frequency of the disk 14. Additionally, it is possible to make use of the VCM current monitoring section 72 is that is shown in FIG. 7 and FIG. 14 to measure the eccentricity by detecting the average value of the second integral of the servo signal when control is performed so that the head tracks to the servo track. It is further possible to multiply the position error signal (PES) when this type of control is performed by the inverse model of the control loop to calculate the eccentricity.

In the foregoing descriptions, the focus was only on the eccentricity of the servo track with respect to the center of rotation. Because the servo track is externally recorded, it is possible to use a precision apparatus to make a precise recording thereof, thereby enabling servo track recording with an accuracy that far exceeds that of the previously employed method of recording the servo track after assembly. However, as would be expected, error still exists and, particularly due to vibration and the like of the disk apparatus during the recording process, the recorded servo track has variations of a period that is shorter than one rotation, that is, variation of a high frequency.

Figure 15:
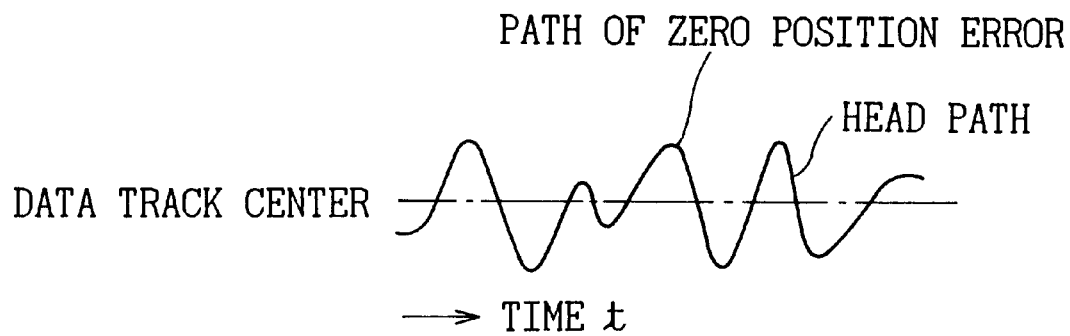
FIG. 15 is a waveform diagram which shows the path of a head in the case in which there is a high-order variation component.

FIG. 15 is a waveform diagram which shows the path of a head when a high-order variation component that is higher than the rotational frequency of the disk.

A variation caused by eccentricity of the servo track with respect to the center of rotation, which has the same frequency as the rotational frequency, is removed by a configuration as was described earlier herein. However, in the presence of high-order variation components in the servo track as noted above, even if the position error is controlled so as to be zero, because of the variation of the servo track itself, the head path will vary from the nominal track as shown in FIG. 15. Therefore, it is desirable to perform compensation for this type of variation as well.

In the second embodiment, the disk is caused to rotate with the head held fixed, the head position being detected in servo track coordinates this position being stored as in the circular rotational path position table 42. Since the detected head position includes the above-noted high-order components, in the second embodiment compensation is performed as well for the high-order variation component of the servo track, the resulting head path being as shown in FIG. 16.

Figure 16:
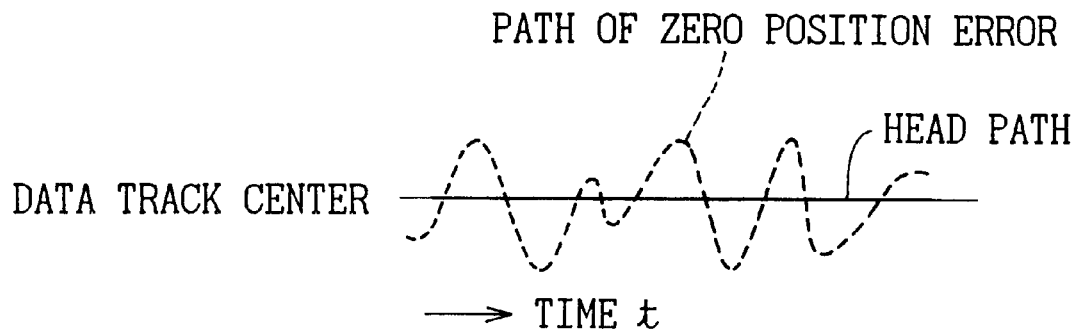
FIG. 16 is a waveform diagram which shows the path of a head when a high-order variation component is compensated.
Figure 17:
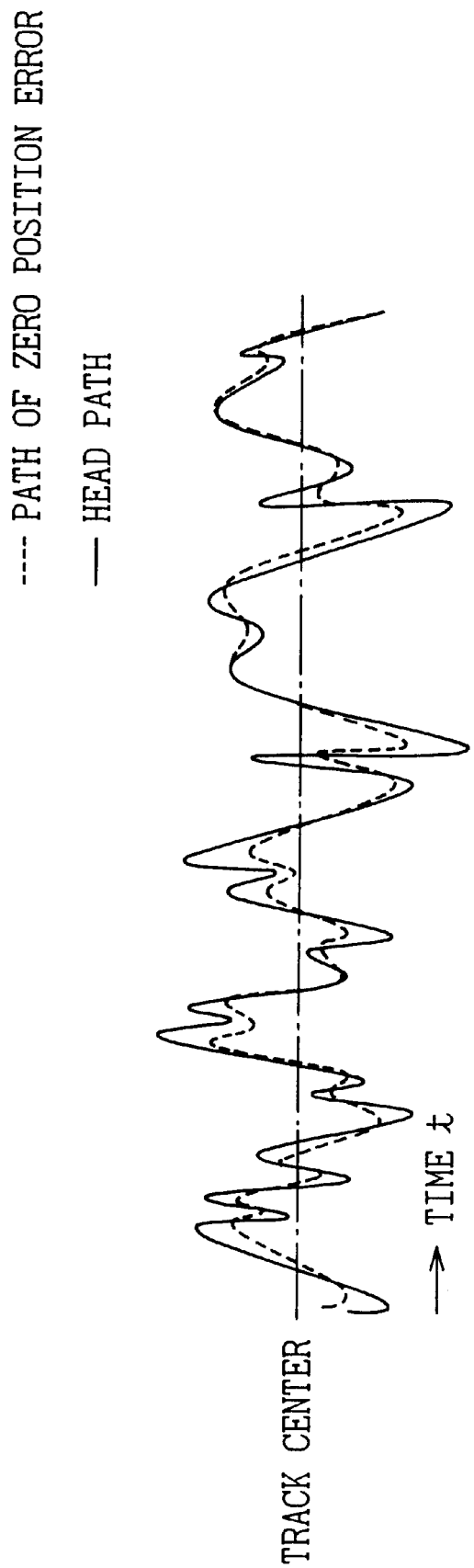
FIG. 17 is a conceptual drawing for the purpose of illustrating the procedure for detecting the RRO and RRO' displacements.

FIG. 16 shows the variation component RRO', and if an attempt is made to perform the above-described control of this component, because of a delay in the control signal the head will exhibit undulation between the displacement to control the RRO' displacement component and the displacement caused by the control, the upper-frequency region being more emphasized, there being cases in which a large undulation occurs. FIG. 17 illustrates the occurrence of such an undulation, from which it can be seen that the undulation that is generated is larger than the RRO displacement.

Next, a method of isolating and measuring a high-order component will be described. Variations caused by variations in the servo track itself or eccentricity and the like occur repeatedly with a period that is rotational period of the disk. For this reason, these are known as RRO (repeatable runout). The totality of the displacement is referred to as the RRO displacement, the displacement component of which is the RRO displacement minus the rotational period component being referred to as the RRO' displacement component.

Figure 18:
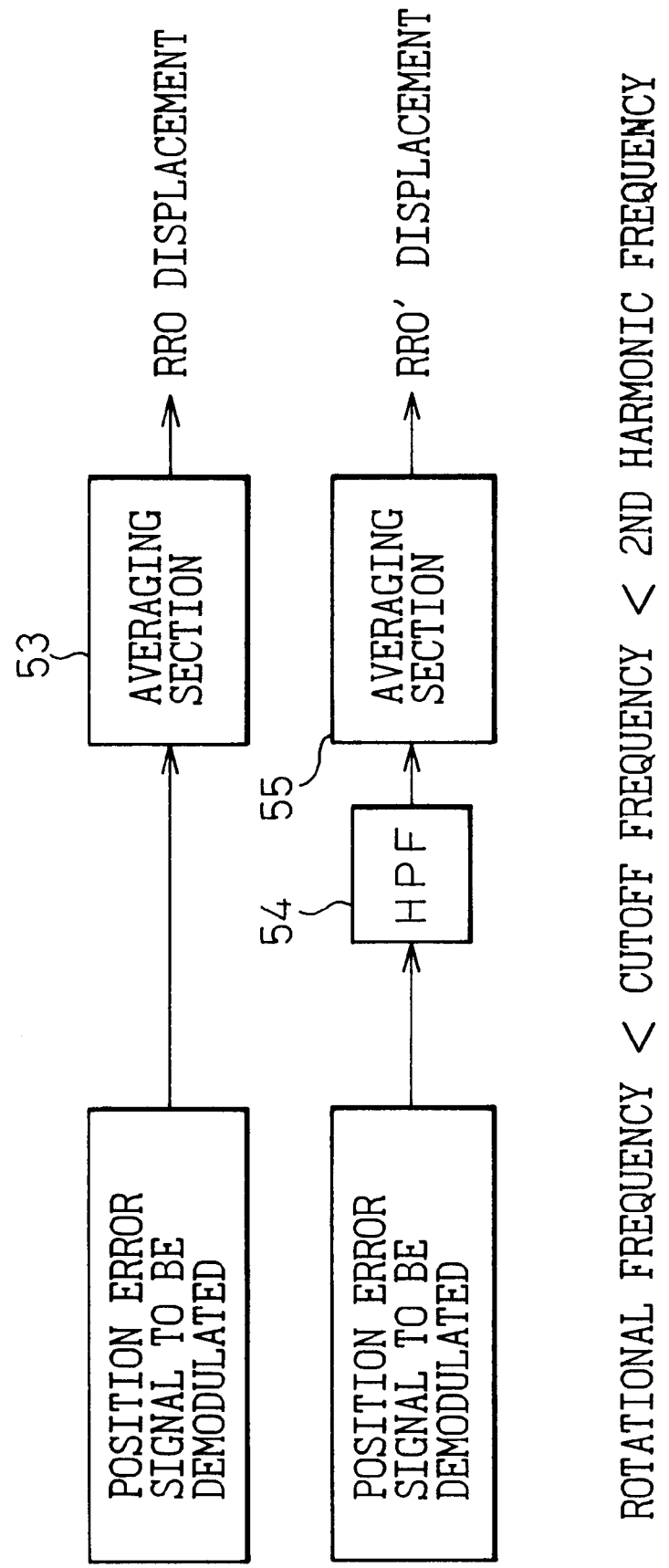
FIG. 18 is a block diagram of a circuit which detects the displacement RRO' at the surface of the disk.

FIG. 18 is a drawing which shows a method of detecting the RRO displacement component and the RRO' displacement component.

As shown in FIG. 18, to detect the RRO displacement component, the average of the position error signal PES which is shown in FIG. 7 is calculated. The averaging is done, for example, by accumulating N samples of data and dividing the result by N. In contrast to this, to detect the RRO' displacement component, the position error signal PES is passed through a highpass filter having a cutoff frequency that is higher than the rotational frequency but lower than twice the rotational frequency, after which averaging is performed thereon.

The high-order frequency components are desirably established with consideration given to the sector sampling frequency so as to have an upper frequency limit that is, for example, ¼ the sector sampling frequency.

FIG. 19 is a circuit block diagram that shows a circuit that detects the RRO' displacement component in a disk drive.

With regard to FIG. 19, the control loop shown is the feedback loop shown in FIG. 7, having the head amplifier 10, the head position signal detection section 20, the adder/subtractor circuit, the control calculation circuit section 61, the head amplifier 70 and the VCM 80, with the exception of the amplifier 70 (for simplicity), the control calculation circuit section 61 of FIG. 7 corresponding to the control circuit 64 in FIG. 19. The control circuit 64 lowers the position error signal PES loop gain in applying the error signal to the VCM 80, and reduces the servo bandwidth to below that of the rotational frequency. In a loop such as this, the position error signal is passed through a highpass filter having a cutoff frequency that is higher than the rotation frequency but not exceeding twice the rotational frequency, the output thereof being averaged to measure the RRO' displacement component.

As described in detail above, according to the present invention, it is possible to implement a magnetic disk apparatus and head position control method therefor which enable high-speed access, even if a track which is defined by servo information recorded on a disk surface is eccentric with respect to the center of rotation. Further, power consumption can be reduced.

Further, there can be various modifications of the present invention. For example, the eccentricities of circular paths defined by the servo information recorded on the disks with respect to the center of rotation are measured by using external equipments, and the measured eccentricities are stored as circular rotational path servo information. In this case, the circular rotational path servo information generating means 8 can be omitted from the disk drive.

What is claimed is:

1. A disk drive comprising:
   a spindle motor having a rotatable spindle:
      a disk mounted to said spindle motor and storing servo information disposed along each of a plurality of concentric circles, said servo information defining a plurality of servo circular paths;
      a head for reproducing said servo information;
      a head positioning mechanism for positioning said head with respect to said disk;
      a detector for generating a head position signal from the reproduced servo information;
      a memory storing head position adjusting information representing eccentricity between said servo circular paths and hypothetical circular paths, said hypothetical circular paths being concentric circles around a center of said rotatable spindle; and
      a controller for generating a head position control signal to said head positioning mechanism based on said head position signal and said head position adjusting information so that said head tracks a selected one of said hypothetical circular paths for writing and/or reading data on said selected one of said hypothetical circular paths.

2. A disk drive according to claim 1, wherein said head is provided for each recording surface of said disk, and wherein said memory stores said head position adjusting information for each pair of said recording surface and said head of said disk.

3. A disk drive according to claim 2 further including a plurality of disks.

4. A disk drive according to claim 2, wherein said disk is divided into a plurality of sectors, into each one of which is stored said servo information.

5. A disk drive according to claim 1, wherein said head position adjusting information is an amount and rotational angle direction of said eccentricity, and wherein said controller comprises a hypothetical circular path value calculation means which calculates hypothetical circular path position information for the purpose of tracking said hypothetical circular paths, said calculation being performed for each prescribed rotational angular position of said disk, based on said amounts of eccentricity and rotational angle direction thereof, whereby said head positioning mechanism is controlled based on said hypothetical circular path position information calculated by said hypothetical circular path value calculation means.

6. A disk drive according to claim 1, wherein said disk is divided into a plurality of sectors, onto each of which is recorded said servo information, and wherein said head position adjusting information is radial direction position information for each sector so as to track said hypothetical circular paths, and further wherein said memory stores a hypothetical circular path position table into which is stored radial direction position information for each sector so as to track said hypothetical circular paths.

7. A disk drive according to claim 6, wherein said head position adjusting information is recorded on said disk as said servo information, said memory being said disk.

8. A disk drive according to claim 6, wherein said head position adjusting information is recorded on said disk as said servo information, and further wherein said memory stores said head position adjusting information which is read out at the time said disk drive is started.

9. A disk drive according to claim 1, further comprising an adjusting information generating means, which measures said eccentricity and generates said head position adjusting information, wherein said memory stores said head position adjusting information generated by said adjusting information generating means.

10. A disk drive according to claim 9, wherein said adjusting information generating means measures said eccentricity by detecting said servo information on said disk using said head when said head is brought into contact with stopping means and said disk is caused to rotate.

11. A disk drive according to claim 9, wherein said adjusting information generating means measures said eccentricity by detecting said servo information on said disk using said head, said measurement being performed with the frequency bandwidth of a servo signal used to control the position of said head limited to lower than the rotational frequency of said disk, and with said disk being caused to rotate.

12. A disk drive according to claim 9, wherein said adjusting information generating means measures said eccentricity from an average value of said head position control signal when control is performed so that said head follows said servo circular paths.

13. A disk drive according to claim 9, wherein said adjusting information generating means measures said eccentricity by detecting said servo information on said disk using said head, with said head positioned by means of position controlling means external to said disk drive, and with said disk being caused to rotate.

14. A disk drive according to claim 9, wherein said adjusting information generating means, in addition to measuring the eccentricity, measures also a high-order frequency component of the difference between said servo circular path and said hypothetical circular path which is higher in frequency than the rotational frequency of said disk, said adjusting information generating means generating said head position adjusting information which includes high-order frequency components for the purpose of controlling said head so as to follow said hypothetical circular path, and said memory stores said head position adjusting information which includes high-order frequency components.

15. A disk drive according to claim 14, wherein a high-order frequency component that is detected by said adjusting information generating means has an upper frequency limit that is ¼ of the sector sampling frequency or lower.

16. A disk drive according to claim 14, wherein said adjusting information generating means calculates said high-order frequency component by calculating the average of the difference between said head position signal and a target servo path to which said head is to be caused to track, said difference being a position error signal, by units of sectors.

17. A disk drive according to claim 14, wherein said adjusting information generating means comprises a filter which removes from said head position signal, which is extracted from said servo information, frequencies below two times the rotational frequency of said disk, said head position signal which has passed through said filter being taken as said high-order frequency component.

18. A disk drive according to claim 17, wherein said filter is a FIR (finite impulse response) type digital filter.

19. A disk drive according to claim 11, wherein said adjusting information generating means measures said high-order frequency component by averaging only those components within a prescribed frequency range of said position error signal under a condition of performing feedback control so that said head position control signal is limited to lower than the rotational frequency of said disk.

20. A disk drive according to claim 19, wherein said prescribed frequency range is equal to or higher than said rotational frequency, but not exceeding twice said rotational frequency.

21. A head position control method of a disk drive for positioning a head over a disk which rotates about a center of rotation, and has servo information recorded on servo circular paths, said position control method comprising the steps of:

reading out head position adjusting information representing an eccentricity between the servo circular paths and hypothetical circular paths, said hypothetical circular paths being concentric circles around a center of a rotatable spindle;

detecting a head position from the servo information;

calculating a compensation signal from said head position adjusting information and said position of said head; and performing control of said head based on said compensation signal so that said head follows said hypothetical circular paths for writing and/or reading data on a selected one of said hypothetical circular paths.

22. A head position control method according to claim 21, further comprising the steps of:

measuring said eccentricity of the servo circular paths with respect to said hypothetical circular paths;

generating said head position adjusting information from said eccentricity; and storing said head position adjusting information;

wherein said steps of reading out said head position adjusting information, detecting said compensation signal and performing said control of said head are performed after said steps of measuring, generating, and storing are completed.

* * * * *